US006801276B1

(12) United States Patent
Epstein et al.

(10) Patent No.: US 6,801,276 B1
(45) Date of Patent: Oct. 5, 2004

(54) OPTICAL COMPONENT WITH A STRUCTURED ELEMENT

(75) Inventors: Kenneth A. Epstein, St. Paul, MN (US); Olester Benson, Jr., Woodbury, MN (US); Andrew J. Ouderkirk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/510,722

(22) Filed: Feb. 24, 2000

Related U.S. Application Data

(62) Division of application No. 09/065,715, filed on Apr. 24, 1998.

(51) Int. Cl.[7] .............................................. G02F 1/1333
(52) U.S. Cl. ....................... 349/112; 349/113; 359/599; 359/607
(58) Field of Search ................................ 359/601, 609, 359/59 R; 349/112, 64, 113

(56) References Cited

U.S. PATENT DOCUMENTS

| 4,268,127 A | | 5/1981 | Oshima et al. |
| 4,456,336 A | * | 6/1984 | Chung et al. ............... 349/113 |
| 4,720,426 A | | 1/1988 | Englert et al. |
| 5,139,340 A | | 8/1992 | Okumura |
| 5,161,041 A | * | 11/1992 | Abileah et al. ............... 349/62 |
| 5,175,030 A | * | 12/1992 | Lu et al. ....................... 428/30 |
| 5,333,021 A | * | 7/1994 | Mitsutake et al. ........... 353/122 |
| 5,486,940 A | * | 1/1996 | Fergason et al. ............. 349/122 |
| 5,587,816 A | * | 12/1996 | Gunjima et al. .............. 349/62 |
| 5,608,550 A | | 3/1997 | Epstein et al. |
| 5,629,784 A | | 5/1997 | Abileah et al. |
| 5,706,065 A | * | 1/1998 | Yano ........................... 349/112 |
| 5,735,988 A | | 4/1998 | Chau et al. |

(List continued on next page.)

FOREIGN PATENT DOCUMENTS

| EP | 696753 | 2/1996 |
| EP | 843195 | 7/1996 |
| JP | 7-7104127 | 9/1993 |

(List continued on next page.)

OTHER PUBLICATIONS 3M, 3M Image Directing Film (IDF) II:, 3M Product Brochure, 1997.

3M, "Image Directing Film II Application Guidelines", Jun. 22, 1999.

*Primary Examiner*—Kenneth Parker
(74) *Attorney, Agent, or Firm*—William D. Miller

(57) ABSTRACT

An optical component including a mirror surface, a structured polymer layer including one side having structured elements, and a filler layer adjacent to the side of the structured polymer layer having the structured elements. The filler layer fills in the structured elements and has one substantially planar side. The filler layer has a refractive index $N_f$, the structured polymer layer has a refractive index of $N_s$, and $N_s$ is different from $N_f$. The optical component is useful to direct backreflected ambient light to a peak angle that is different than a glare peak. A display device is also described including a first and second polarizer, a liquid crystal layer below the first polarizer, a mirror surface below the liquid crystal layer, and a structured polymer layer comprising one side having structured elements. The display device also includes a filler layer adjacent to the side of the structured polymer layer having the structured elements, the filler layer filling in the structured elements and having one substantially planar side.

65 Claims, 24 Drawing Sheets

U.S. PATENT DOCUMENTS

| | | | |
|---|---|---|---|
| 5,796,455 A | * 8/1998 | Mizobata et al. | 349/116 |
| 5,818,554 A | 10/1998 | Hiyama et al. | |
| 5,880,800 A | 3/1999 | Mikura et al. | |
| 6,014,197 A | * 1/2000 | Hikmet | 349/201 |
| 6,104,446 A | * 8/2000 | Blankenbecler et al. | 349/5 |
| 6,147,732 A | * 11/2000 | Aoyama et al. | 349/112 |
| 6,147,802 A | * 11/2000 | Itoh et al. | 359/500 |
| 6,166,787 A | * 12/2000 | Akins et al. | 349/57 |

FOREIGN PATENT DOCUMENTS

| | | |
|---|---|---|
| JP | 6-095099 | 4/1994 |
| WO | WO 95/17699 | 6/1995 |
| WO | WO 97/01610 | 1/1997 |
| WO | WO 97/01781 | 1/1997 |
| WO | WO 97/05521 | 2/1997 |
| WO | WO 99/56158 | 11/1999 |

* cited by examiner

OPTICAL COMPONENT WITH A STRUCTURED ELEMENT

This application is a division of U.S. Ser. No. 09/065,715, filed Apr. 24, 1998, the entire contents of which is hereby incorporate by reference.

BACKGROUND

The present invention pertains to light diffusing elements provided in intimate optical contact with other surfaces. More particularly, the present invention pertains to optical elements having excellent forward scattering properties and which exhibit low backscatter, and which can further provide adhesive properties.

Diffusion of light is a highly useful phenomenon that finds many applications in optical systems. For example, liquid crystal or other displays often use a diffuser to increase viewing angle of the device and to make unwanted intensity variations less visible to the viewer. Diffusers can be incorporated into optical systems by adding an additional diffuser component to the system, or, in some cases, by incorporating diffusive properties into an existing component by, for example, etching or sandblasting a surface of an existing optical component. Adding additional components to an optical system has the disadvantage of introducing additional absorption and creating additional interfaces that can reflect light, thereby causing loss of illumination and other forms of image degradation. On the other hand, incorporating a diffusing layer into an existing component in the system complicates component design, adds manufacturing steps, and can have an adverse effect on performance and on product yield during manufacturing.

SUMMARY OF THE INVENTION

The present invention provides an optical component including a structured polymer layer. In one embodiment, the optical component is useful to direct backreflected ambient light to a peak angle that is different than a glare peak. The optical component includes a mirror surface, the structured polymer layer including one side having structured elements, and a filler layer adjacent to the side of the structured polymer layer having the structured elements. The filler layer fills in the structured elements and has one substantially planar side. The filler layer has a refractive index $N_f$, the structured polymer layer has a refractive index of $N_s$, and $N_s$ is different from $N_f$. The ambient light that is backreflected from the mirror surface is directed to a peak angle that is different from a glare peak angle of the optical component.

In one embodiment of the optical component, the difference between $N_s$ and $N_f$ is at least 0.15. The value of $N_s$ may be greater than $N_f$. In one embodiment, $N_s$ is greater than or equal to about 1.34 and less than or equal to about 1.63. $N_f$ may be greater than or equal to about 1.35 and less than or equal to about 1.49.

In one embodiment, the filler layer may be a diffusing material or a diffuse adhesive material. The optical component could include a diffusing layer that may be adjacent to the filler layer.

In another embodiment, the present invention provides a display device including a first and second polarizer, a liquid crystal layer below the first polarizer, a mirror surface below the liquid crystal layer, and a structured polymer layer comprising one side having structured elements. The display device also includes a filler layer adjacent to the side of the structured polymer layer having the structured elements, the filler layer filling in the structured elements and having one substantially planar side. In one alternative, the structured polymer layer and filler layer are between the first and second polarizers. The display device may be configured so that the filler layer has a refractive index $N_f$, the structured polymer layer has a refractive index of $N_s$, $N_s$ is different from $N_f$. In one embodiment of the display device, ambient light that is backreflected from the mirror surface is directed to a peak angle that is different from a glare peak angle of the optical component.

According to another embodiment of the present invention, a display device includes a polarizer, a liquid crystal layer below the polarizer, a mirror surface below the liquid crystal layer, and a structured polymer layer above the liquid crystal layer. The structured polymer layer has one side having structured elements. The display device also includes a filler layer adjacent to the side of the structured polymer layer having the structured elements, the filler layer filling in the structured elements and having one substantially planar side. The filler layer has a refractive index $N_s$ and the structured polymer layer has a refractive index of $N_s$, $N_s$ is different from $N_s$. The structured polymer layer and the filler layer are between the polarizer and the mirror layer. The ambient light that is backreflected from the mirror surface is directed to a peak angle that is different from a glare peak angle of the optical component.

According to another embodiment of the present invention, a display device includes a polarizer, a liquid crystal layer below the polarizer, a mirror surface below the liquid crystal layer, and a structured polymer layer between the liquid crystal layer and the mirror surface, where the structured polymer layer includes one side having structured elements. The display device also includes a filler layer adjacent to the side of the structured polymer layer having the structured elements, the filler layer filling in the structured elements and having one substantially planar side. The filler layer has a refractive index $N_f$ and the structured polymer layer has a refractive index of $N_s$, and $N_s$ is different from $N_f$. The structured polymer layer and the filler layer are between the polarizer and the mirror layer. Ambient light that is backreflected from the mirror surface is directed to a peak angle that is different from a glare peak angle of the optical component.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE INVENTION

Figure 1:
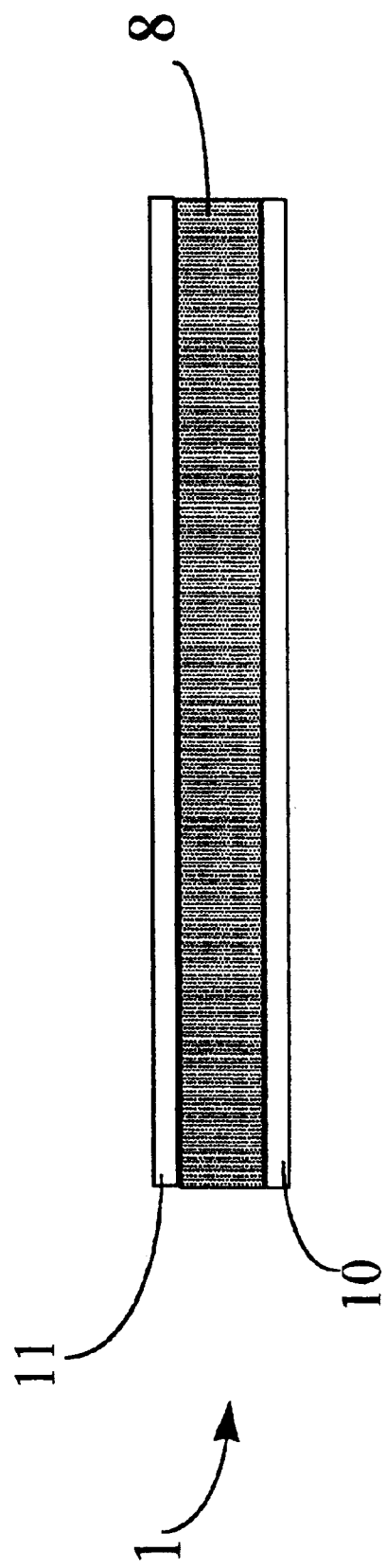
FIG. 1 is a schematic illustrating one embodiment of the invention.

Referring to FIG. 1, a self-adhering diffuser 8 of the present invention is provided as composite transferable diffuser 1. The diffuser 8 preferably comprises a pressure sensitive diffuse adhesive contained between removable release liners 10 and 11. Materials suitable for release liners 10 and 11 are well known in the pressure sensitive adhesive art. It is preferred that diffuser 8 have sufficient adhesion to release liners 10 and 11 to allow handling of the transferable diffuser 1 prior to application to a substrate. The adhesion to the liners should be sufficiently low, however, to allow removal of the liners prior to transfer of the diffuser. It is advantageous for one of liners 10 and 11 to have less adhesion to the diffuser 8 than the other liner, so as to provide consistent preferential release of one of the liners over the other. To facilitate explanation, it will hereinafter be understood that when a difference in adhesion between layers 10 and 11 is present, layer 10 will be the layer with the lowest adhesion to the diffuser 8, and therefore the layer first removed during transfer of the diffuser 8.

Suitable materials for the self-adhering diffuser 8 are disclosed in WO 97/01610. It is preferred, for most applications, that the diffuser 8 scatter, or diffuse, light primarily in the forward direction, that is to say the general direction of incident light transmission, and scatter a relatively small amount of light in the backward direction. It is further preferred that the diffuser 8 preserve the polarization of the diffusely transmitted light. In situations where higher levels of backward scattering of light, or backscatter, are permitted or preferred, or where polarization preservation is not needed or is not desired, the diffuser 8 may comprise other conformable or pressure sensitive diffusing materials which exhibit suitable properties to accomplish such purposes. In certain instances, it will be appreciated that intimate optical contact between a diffuser and an adjacent optical component can be achieved if the diffusing layer is merely conformable, but not necessarily adhesive. Such a conformable diffuser could serve useful optical functions in applications not requiring an adhesive. In that case, a transfer diffuser could be used which merely conforms to a surface of a substrate to which it is transferred, without actually adhering to it. Suitable conformable materials include, besides pressure sensitive adhesives, various transparent elastomeric materials that could be urged into contact with surfaces by application of an external compressive force, which may optionally be applied to elevated temperatures.

To apply the transferable diffuser 1, layer 10 is first removed exposing a first surface of the diffuser 8 while the other surface remains protected by the other release liner 11. The exposed surface of the diffuser 8 may be laminated directly to another optical component of a final construction with the adhesive force being provided by the diffuser 8. After lamination, liner 11 may be removed to expose the second surface of the diffuser 8. This surface may then be laminated to another optical component of the final construction. In this manner, two optical components, typically having a third optical component (e.g., a diffuser) laminated between them, can be laminated together with the diffuser providing the lamination adhesive as well as the optical function of the diffuser. Lamination is normally performed at room temperature, but lamination at elevated temperatures may in some cases be advantageous. For example, the self-adhering transfer diffuser may be constructed of a hot-melt adhesive, having diffusion properties incorporated therein.

Techniques for smoothly laminating layers together with pressure sensitive adhesives (and other adhesives) without entrapping air bubbles or other contaminants are well known to those of ordinary skill in the art. While it is desirable to perform this lamination without entrapment of air bubbles or other contaminants, it will be appreciated that since the diffuser 8 is the adhesive used in the lamination, some hiding of such defects will occur. The hiding capability permits the use of the transferable diffuser in place of pressure sensitive adhesives in optical assemblies wherein non-diffusing pressure sensitive adhesives might not otherwise be suitable, due to their tendency to produce visible lamination defects and their inability to hide them.

Figure 2:
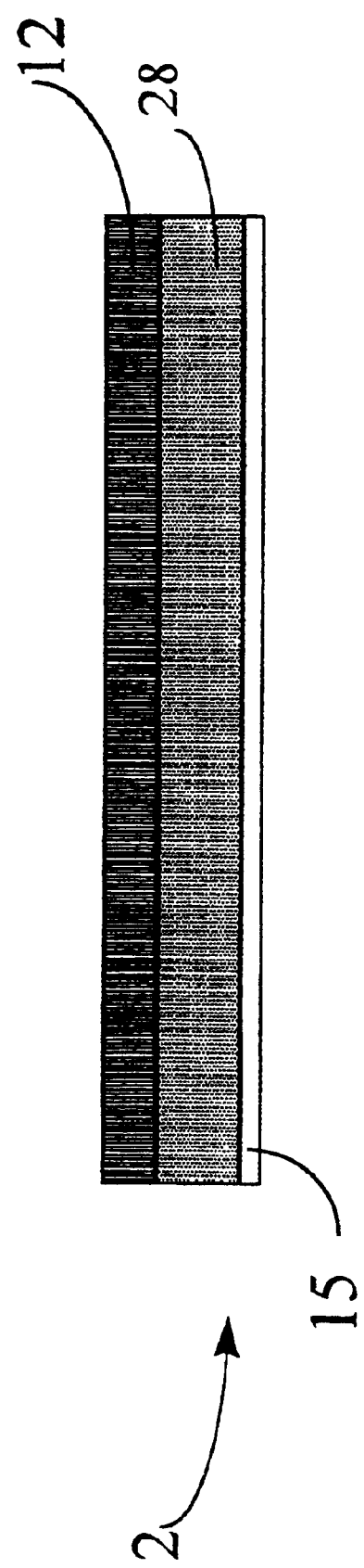
FIG. 2 is a schematic illustrating another embodiment of the invention.

Referring to FIG. 2, a self-adhering optical element 2 is illustrated. The optical element includes a self-adhering diffuser 28 bonded to an optical component 12. The optical component 12 may be a number of different optical components, with certain components being particularly suited to use with a self-adhering diffuser. For example, a polarizer, a birefringent layer, a holographic element, an antireflective film, a reflective element, a spectral filter, or any optical element which can be beneficially used in close proximity to a diffusing layer may be combined with the transfer diffuser of the present invention to form a self-adhering optical element. When element 12 is a polarizer, it can be a reflecting or absorbing linear polarizer, a circular polarizer, or any other polarizer which can be placed in close proximity to a diffuser. Optical element 12 may produce optical effects by virtue of its physical structure as well as by virtue of its optical properties. Element 12 may, for example, comprise brightness enhancing prism film, prismatic surfaces, light redirecting films, retro-reflective structures, reflective or partially reflective layers, or structured layers embedded in other materials, as might be produced by casting various materials onto structured surfaces.

As noted above, a diffuser 28 can be applied to element 12 by lamination of the transfer diffuser 1 shown in FIG. 1. In accordance with another embodiment, the diffuser 28 can be applied as a curable coating on optical element 12 and cured to a pressure sensitive adhesive state. A release liner 15 may then be applied to the exposed adhesive side of the diffuser. The self-adhering optical element 2 can subsequently be laminated to a number of other optical substrates via the adhesive property of the diffuser 28 by removing the release liner 15.

When layer 12 of FIG. 2 is an absorbing polarizer, the present invention finds application in reflective liquid crystal displays, or R-LCDs, which can be of the double polarizer or single polarizer type. Both of these types of displays have been found to benefit from the controlled degree of diffusion, low backscatter and polarization preservation that the present invention provides. Zero-polarizer LCDs such as Guest-Host or cholesteric can also benefit from the controlled diffusion and low backscatter properties of the present invention. Additionally, when the diffusers of the present invention are pressure sensitive adhesives, ease of assembly of the displays is also improved.

When layer 12 is a reflective polarizer, the present invention has utility in reflective and transmissive displays. Liquid crystal displays that utilize one or two polarizers depend on the optical activity and birefringence of the liquid crystal layer to change the polarization of light from its initial prepared state to a selectable final state that can be imaged. The image is formed either with a second polarizer, in the case of two polarizer displays, or by reflecting the light back through the first polarizer, in the case of one polarizer displays.

The most common R-LCDs used are the two polarizer TN and FSTN. These displays satisfy a need for efficiencies in power, volume and low weight in applications that require low to medium density information content in a monochrome display. These same requirements now motivate the adoption of R-LCD to high information content displays as used in notebook and laptop computers. The pixel size is decreasing towards 0.22 mm with sub-pixelation for color. This causes a problem for conventional TN and STN R-LCD displays, in that optical crosstalk between pixels, due to the parallax between the liquid crystal plane and the back-reflector, tends to degrade image quality.

Conventional two polarizer R-LCDs contain an electrically addressable liquid crystal layer disposed between two glass plates. A transmissive linear polarizer is adhered to the top glass plate and a linear polarizer in combination with a diffuse back-reflector, constituting a polarizing back-reflector, is adhered to the bottom glass plate. Electrical modulation of the liquid crystal director orientation between the two polarizers causes the device to switch from a bright reflective appearance to a dark appearance or some gray level in between. A LCD display is divided into an array of electrically addressable pixels.

In conventional reflective LCD displays, the diffusion property of the back reflector is required because most ambient light sources are distant and discrete, so that incident light has a high level of collimation. The light diffusion produced by the back reflector serves to break up the reflected image of the source and to provide a uniform appearance and wide viewing angle. By conservation of energy, however, no new light is created in the diffusion process, so that a tradeoff occurs between viewing angle and screen brightness gain. The ability of the present invention to limit the diffusion of incident light to the level needed to achieve adequate display viewing angles is an advantage of the present invention.

In a two polarizer reflective LCD, light traverses the 2 polarizers and the liquid crystal layer twice, as it enters the LCD and again after reflection at the back-reflector. Light, which traverses one pixel on the incident path, casts an image on the back-reflector. Reflected light, from a neighboring pixel, may also traverse the first pixel on the reflected path. Thus, a transmitted image is also formed. The angle of the incident light and the angle of observation both influence the observed pixel image, which may be of diminished quality due to being a double image. If the neighboring pixels are color sub-pixels, the image may degrade further by color cross-talk.

Optical crosstalk occurs when the pixel pitch becomes less than, or comparable to, the path length between the LC layer and the back-reflector. The problem is clearly evident as the pixel pitch approaches 0.25 mm in cells where the back glass plate can range from 0.3 mm to 0.8 mm thickness. To defeat parallax in R-LCDs, several new designs place the back-reflector on the inside surface of the bottom glass plate. This design change requires either an expensive LCD fabrication process for an integral back reflector/diffuser or a diffuser film, placed on the outside surface of the top glass plate, to replace the function normally reserved for the back-reflector. The diffusing layers of the present invention serve the latter function and are easily tuned to the required diffusion level by adjusting bead size, refractive index, loading density and film thickness. However, additional constraints are the display contrast and the diffuser transmission.

Reflective liquid crystal displays which contain two polarizers, with the light passing through each polarizer twice, often suffer an undesirably high level of light loss, and hence loss of screen brightness. Single polarizer liquid crystal displays can reduce the amount of light lost, and hence improve screen brightness.

R-LCDs can be represented ideally as a birefringent imaging medium between two polarizers. This birefringent medium, or retarder switches between 0-waves and ½-wave retardation, at all visible wavelengths and at all angles of observation. A 1-polarizer R-LCD achieves the effect of a ½-wave retarder in two passes through a single liquid crystalline layer. The simplest structure is a switchable ¼-wave retardation plate. Approximations to the switchable ¼-wave plate are uniform director LC layers such as the vertical alignment nematic (VAN) and the surface stabilized ferro-electric liquid crystal (SSFLC). The effect of a ¼ wave plate is also approximated by a liquid crystal layer having a non-uniform director such as the twisted nematic (TN) or the mixed-mode twisted nematic (MTN) cell. The degree to which these modes deviate from the ideal effects color and contrast, hence compensation films may be beneficial.

Figure 3:
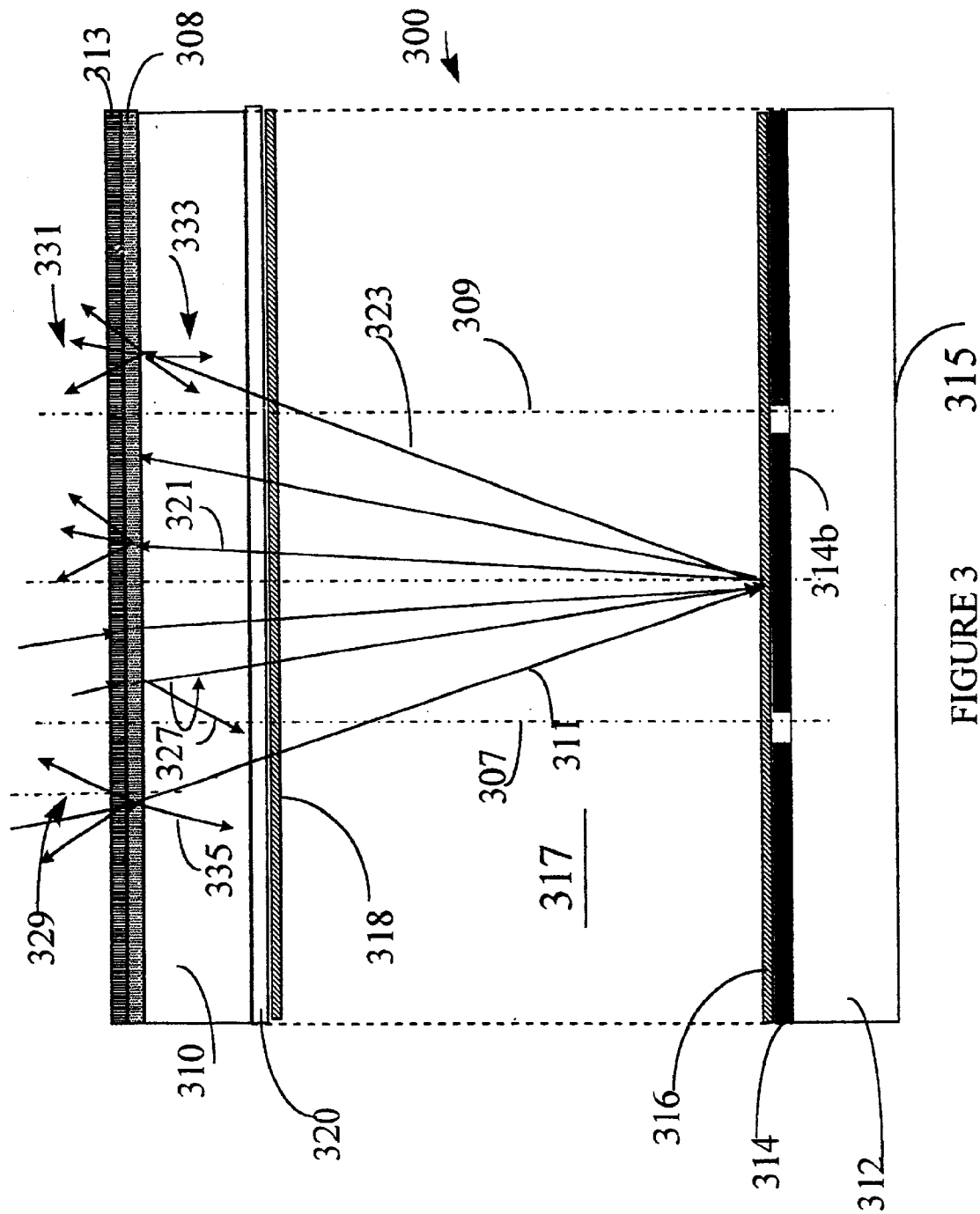
FIG. 3 is a schematic illustrating still another embodiment of the invention.

Referring to FIG. 3, a section of a single polarizer R-LCD is schematically depicted. An absorbing polarizer 313 polarizes incident light as it enters the R-LCD 300 through transparent top plate 310. The polarized light passes through a nematic liquid crystal material in cavity 317. The liquid crystal assumes either an optically active, that is to say polarization rotating, state, or an optically inactive state, wherein no significant rotation of polarization occurs. The combination of active and inactive states is used to produce an image. The state of each pixel of liquid crystal material in cavity 317 is determined by application of an electric field between electrode layers 314 and 320, in a manner well known in the art. Previous R-LCDs have reflected incoming light from a diffuse reflector placed at external surface 315 of a transparent lower plate 312.

Since the lower or back plate 312 is typically quite thick, significant parallax can occur, thereby degrading the image quality. In one embodiment of the present invention, an internal reflector 316 is placed inside the display, above plate 312, in the region of electrode layer 314. In another embodiment, the electrode layer 314 can be a specular reflective layer, if a sufficient amount of diffusion of light can be provided elsewhere in the light path to provide adequate viewability of the display. In the present invention, a diffuser 308 in accordance with the present invention is provided between the polarizer 313 and the top plate 310. The diffuser 308 provides the diffusion required to render the reflected image visible over a range of viewing angles. The self-adhering diffuser of the present invention can further be used to laminate the absorbing polarizer 313 to the top plate 310.

The proper functioning of R-LCD 300 depicted in FIG. 3 requires that the polarization state of light 323 be maintained as it passes through diffuser 308. The diffuser 308 of the present invention is particularly suited for use in a R-LCD due to its ability to preserve polarization while still diffusing light with low absorption. As described more fully below, a diffuser in accordance with one particular embodiment of the present invention exhibits low depolarization of light passing through the diffuser. As further indicated below, the level of light passing through a pair of crossed polarizers with the diffuser interposed therebetween, is less than 0.1% for light leaving the diffusing layer along the direction of incidence, that is to say at 0° scattering angle, and still only about 1% for light scattered at a 20° scattering angle. This indicates a high level of polarization preservation even at a viewing angle of 20°.

It is also desirable that light passing through the diffuser 308 of the R-LCD depicted in FIG. 3 not be absorbed or scattered back into the display. As described more fully below, a diffuser in accordance with the present invention also exhibits a degree of back scattering which is less than about 0.1% of the light incident upon the diffuser. This is shown in ray bundles 329 and 333. Another desirable feature of the diffuser 308 is that the scattering angle be limited to the cone of viewing of the display, so as to make optimum use of the available light. This is shown in ray bundle 331 and is related to the contrast obtainable. A useful measure of scattering angle is the angle θ at which the intensity of the scattered light drops to a predetermined fraction, in this case 1/e, where e=2.71, of its intensity at 0° scattering angle, which is the angle of direct viewing of the display. A diffuser of the present invention was found to have a θ of about 6.0°. Such performance is well suited for viewing displays at convenient viewing angles.

Figure 4:
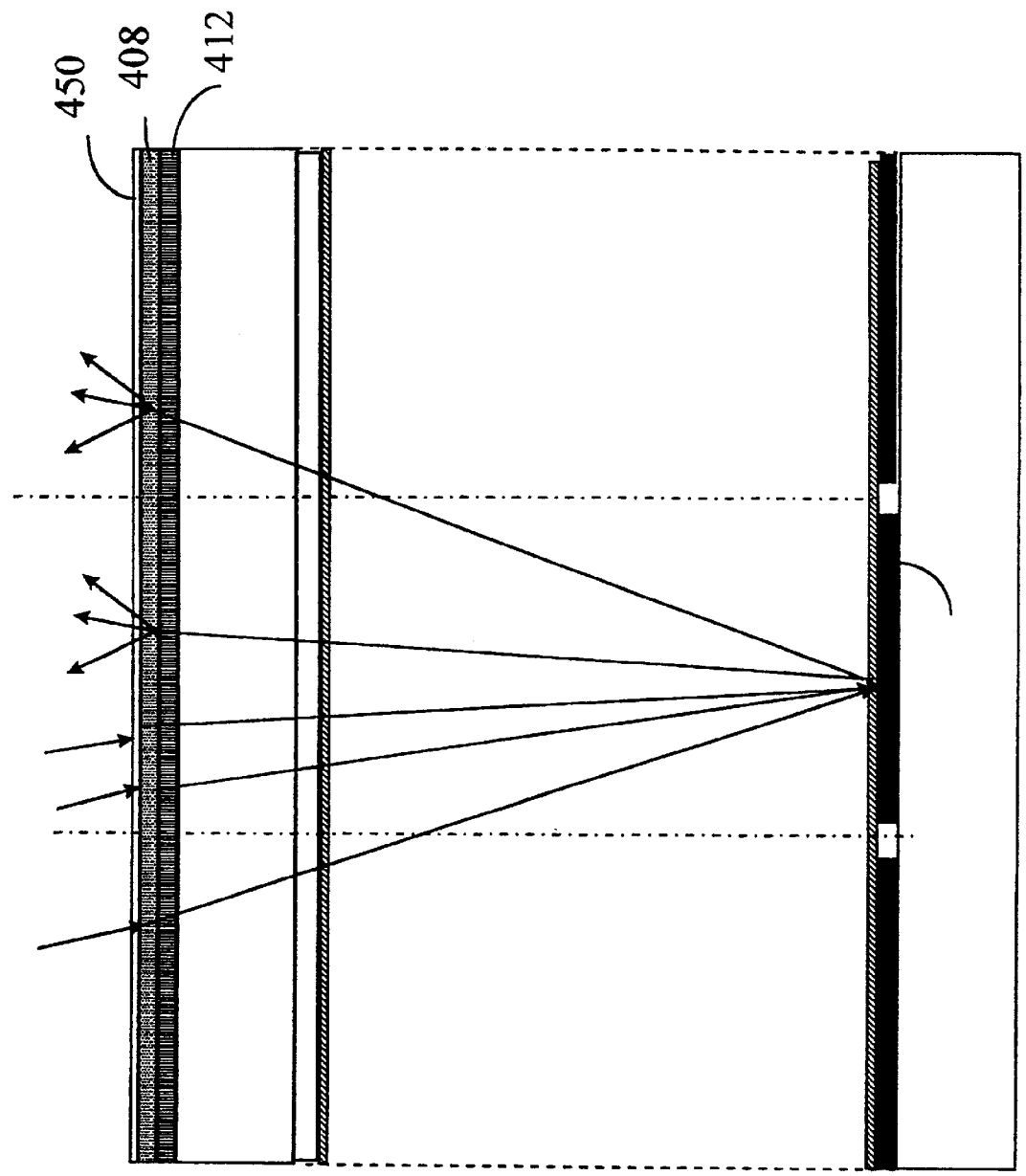
FIG. 4 is a schematic illustrating another embodiment of the invention.

FIG. 4 depicts an alternative embodiment of the present invention that provides a diffuser 408 disposed between a protective layer 450 and the absorbing polarizer 412. The protective layer can be, for example, a polymeric film. The self-adhering diffuser of the present invention can be used to laminate the protective layer 450 to the absorbing polarizer 412. In one embodiment, the combined diffuser 408 and protective layer 450 can be provided as an adherable optical component of the type portrayed in FIG. 2.

Figure 5:
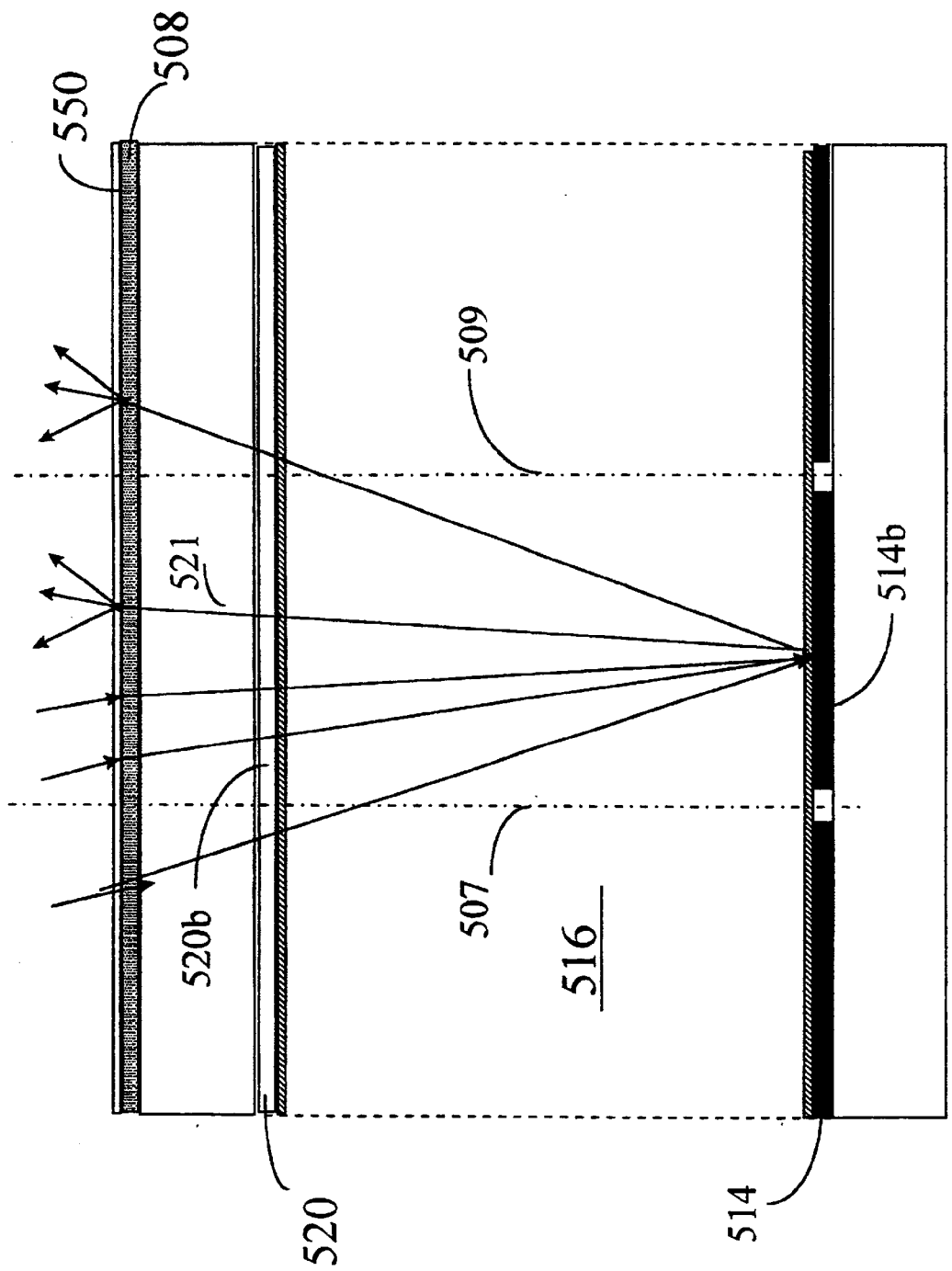
FIG. 5 is a schematic illustrating still another embodiment of the invention.

Referring to FIG. 5, many R-LCDs of the guest-host type do not require an external polarizer. Rather, the liquid crystal material contained in cavity 516 provides a light valve effect that is activated in a pixelwise manner by electrode array 514 and counter-electrode layer 520. Because of low backscatter and controlled scattering angle of the diffusing layers of the present invention, a diffuser 508 in accordance with the present invention is useful for improving viewability of displays of this type. A self-adhering diffuser, (e.g., a pressure sensitive adhesive) may further be used to laminate a protective coating 550 to the top plate 510 of the display.

As noted above, a self-adhering diffuser of the present invention may be constructed with properties particularly suited for use in reflective polarizer displays that use only one or no absorbing polarizers. It has been found that such a diffuser can be particularly tailored for such applications and exhibits a number of features especially advantageous for such uses. Referring to FIG. 6A–6H, the optimization of a self-adhering diffuser is described.

Sample self-adhering diffusers were made and the scattering distribution of the samples was measured. To evaluate the scattering from the bulk of the material, which is representative of the intended use of a self-adhering diffuser, a sample was laminated to a microscope slide and the release liner on the opposing side was left in place. The self-adhering diffuser samples were constructed of a butyl acrylate/acrylic acid pressure sensitive adhesive, loaded 10%, by weight, with a dispersion of 2–10 micron diameter polystyrene/EMA particles. The host adhesive had a refractive index of 1.47 and the particles a refractive index of 1.52, thus the refractive index mismatch $\Delta n=0.05$ provides the required scattering in a dry coating thickness of 0.0015". These parameters can be altered to provide a wide range of performance characteristics. The spherical shape of the particles, low $\Delta n$ and amorphous microstructure combine to provide low depolarization and back-scattering in a diffuser having high transmission and forward scattering.

Forward scattering, illustrated by ray 335 in FIG. 3, tends to dominate when the diffuser particles are much larger than an optical wavelength and/or when the host matrix is matched to the particle with small $\Delta n$. When the particle diameter is less than 1 micron or $\Delta n$ is large, the back-scatter of visible light can become significant.

Light from an Oriel 250 watt incandescent source was collimated and filtered through Schott BG39 glass, to filter out the infra-red spectrum and approximate a photopic response with the crystalline silicon detector. The measurement system consists of a collimated incident beam arm, having a beam divergence of about 1°, and the detector mounted on a goniometer permitting angle dependent detection with a resolution of about 1°.

Figure 6A:
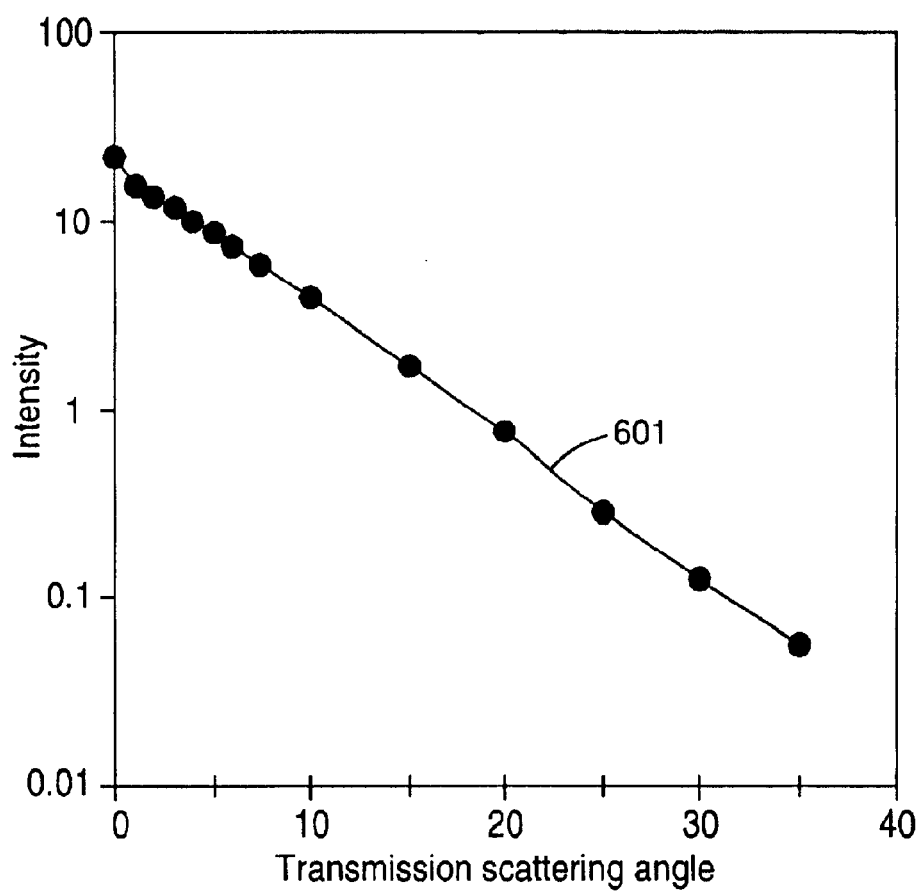
FIGS. 6A–6H, are graphs illustrating the optical performance of a self-adhering diffuser in accordance with one particular embodiment of the invention.

The transmitted intensity versus scattering angle trace 601 is plotted in FIG. 6A. The 1/e half width of the central maximum is 6.0 degrees, derived from a fit to an exponential function (I=19.932 e-0.1676x). It is preferable to have the forward scattering 1/e point to be between 2 degrees to 40 degrees, more preferably between 3 degrees to 20 degrees and most preferably between 3.5 degrees to 10 degrees for single polarizer display applications. The forward scattering angle should be large enough to obscure specular, imaging reflection when placed above a mirrored surface, but not so large as to reduce the reflected brightness by decreasing the angular gain of the film. Such a self-adhering diffuser is particularly suited for use in a single polarizer reflective display. Narrow transmitted distribution allows useable contrast in reflective displays and provides a useable brightness increase by controlling the diffuser gain profile. This improves the brightness of single polarizer reflective displays.

To measure backscatter, self-adhering diffuser samples and clear adhesive (CA) samples were laminated to specularly smooth black acrylic sheet, an optically absorptive medium to account for forward-scattered light, that is back reflected, which is indistinguishable from backscattered light. The refractive index of clear acrylic was about 1.5 and that of the clear adhesive and the self-adhering diffuser host adhesive was about 1.47. The index match provides a low reflectance coupling to the absorptive medium.

Figure 6B:
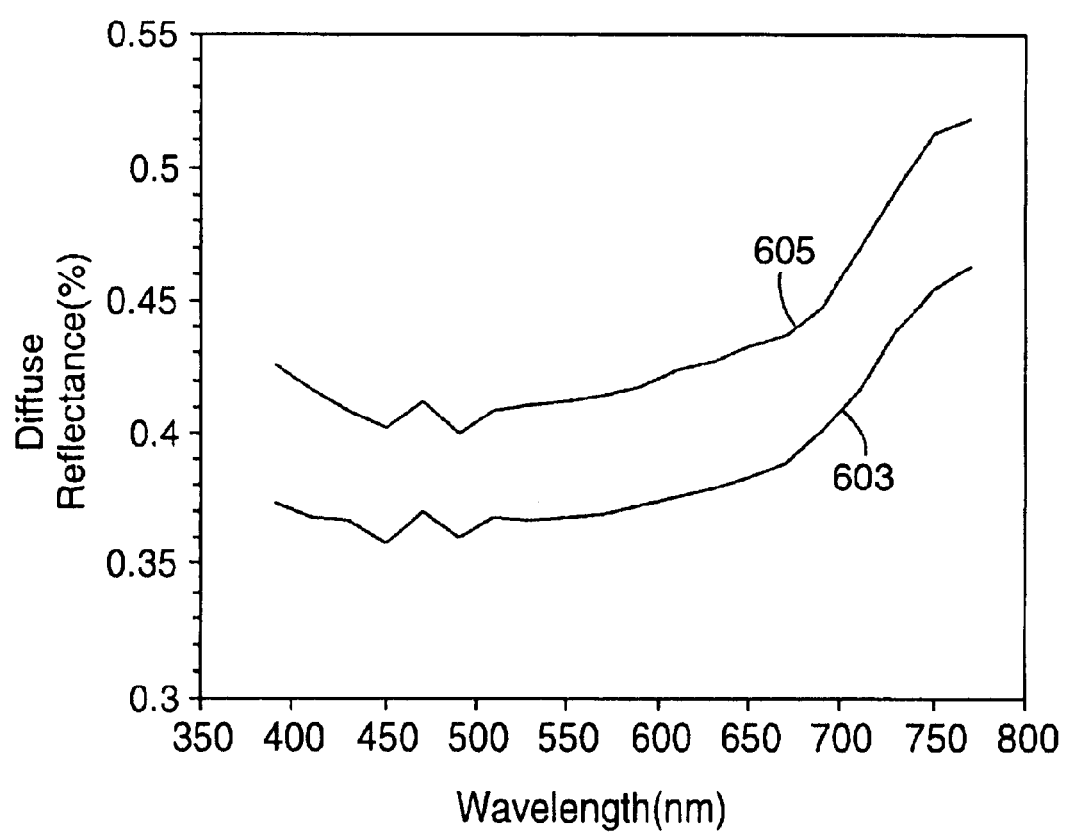
Figure 6C:
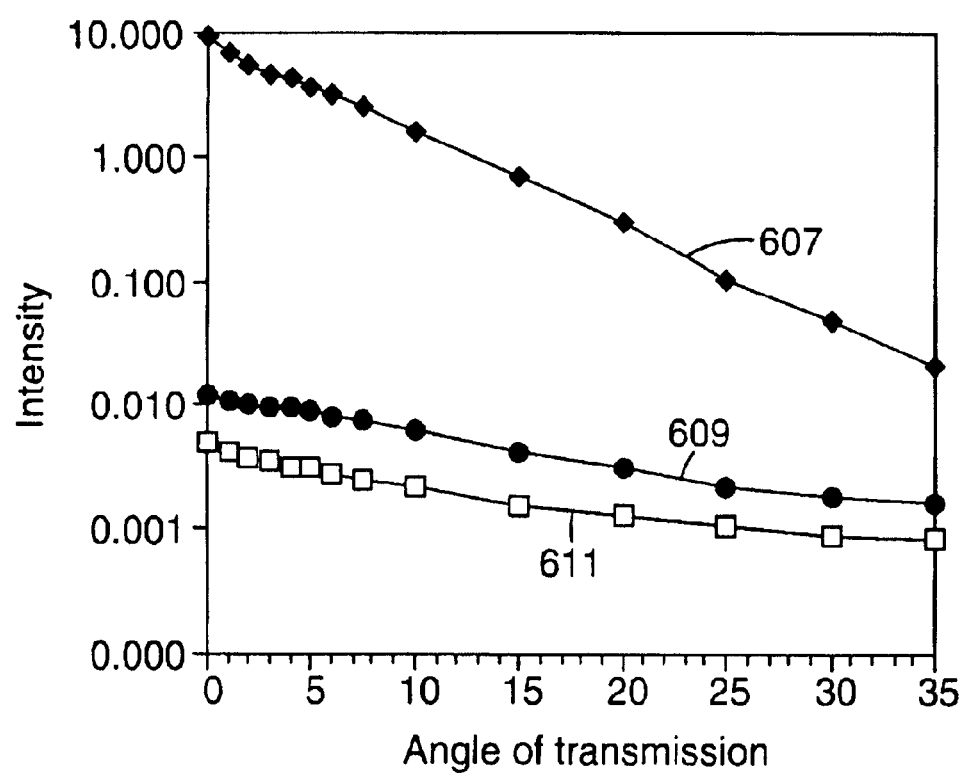

The total reflectance and the diffuse reflectance measurement were made with the Perkin-Elmer Lambda 900 Spectrophotometer. The specular angular region comprises about 0.04 steradians out of the 2Π steradian solid angle of the total reflectance. For single and no polarizer display applications, it is desirable that the self-adhering diffuser have a backscatter of less than about 5%, more preferably less than about 2% and still more preferably less than about 0.5%. Analysis of the reflectance of the clear adhesive and the self-adhering diffuser show that the addition of diffusing particles adds, at most, 0.1% to either the total or the diffuse reflectance. The diffuse reflectance is shown in FIG. 6B. Trace 603 is the diffuse reflectance of the clear adhesive. Trace 605 is the diffuse reflectance of the self-adhering diffuser. The diffuse reflectance of either the clear adhesive or the self-adhering diffuser is virtually identical to that of the bare acrylic substrate. It will be realized that the backscatter of the self-adhering diffuser is at most 0.1% and can be significantly less. When used in displays, backscatter decreases contrast by adding unwanted light into the black state image. The low backscatter allows the self-adhering diffuser of the an embodiment of the present invention to be used in displays with little contrast degradation. This is illustrated with light rays 333 shown in FIG. 3.

Depolarization, illustrated by ray 327 in FIG. 3, is a conversion of a prepared polarization state to another polarization state. The conversion may be a reversible effect due to bulk optical birefringence or an irreversible effect due to microscopic polarization scattering. The prepared polarization state may be linear, circular or elliptical. In the case of a single polarizer LCD, the prepared state is linear polarization. Polarized light scattering of the sample diffuser was measured using the apparatus for measuring the forward scattering distribution shown in FIG. 6A, modified by the additions of a cube polarizer on the incident light arm and a film polarizer on the detector arm. The cube polarizer and film polarizer had respective polarization discriminations of about 10000:1 and 4000:1 in the optical pass band of the BG39 filter.

The orientation of the cube polarizer sets the polarization plane of the incident light relative to the measurement plane (rotation plane of the goniometer). The block-state then refers to the orientation of the film polarizer that provides the best extinction. The pass-state refers to the orientation of the film polarizer rotated 90° from the block-state. Both the pass and is block state intensities were measured versus transmission angle for each of three orientations of the cube polarizer (0°, 45° and 90° relative to the rotation plane of the goniometer). The transmitted intensities are plotted as a function of angle in FIG. 6C. The incident polarization plane weakly affected the pass intensity, hence only one curve is shown (trace 607). The block-state intensity was more strongly affected and the two limiting curves, that of 0° (trace 611) and 45° (trace 609), are shown.

Figure 6D:
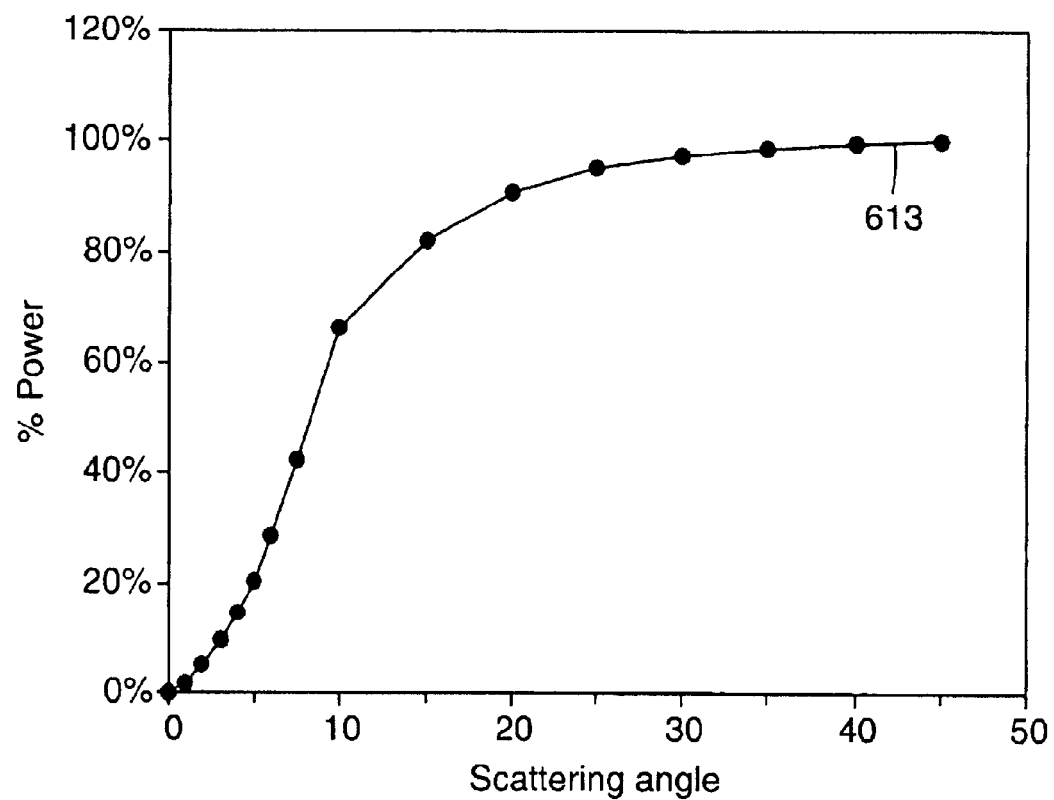

The depolarization ratio is defined here as the ratio of the block state intensity to the pass state intensity. In the figure one can see that the depolarization ratio, for the self-adhering diffuser, amounts to about 0.1% at the 0° scattering angle and rises to about 3% at 35° scattering angle. FIG. 6D, a plot of the encircled power (trace 613), shows that the majority of the scattering occurs within 20° of the incident light axis, where the depolarization is less than 1%. Recalling the scattering power distribution, there is relatively little light available at the 35° scattering angle.

The depolarization ratio of the self-adhering diffuser is sufficiently low to permit its placement between the polarizer and the back-reflector, in many display applications. The importance of doing so might be to supply polarizers, compensation film, or other components with an integral diffuser where such components place the diffuser between the polarizer and the back-reflector. The importance of doing so is to limit the effect of another source of contrast degradation, such as backscatter or the diffusion-limited contrast. Backscatter is reduced by 50% or more when the diffuser is moved from outside, to the space between the polarizer and the back-reflector. The diffusion-limited contrast is affected by any displacement of the diffuser away from the back-reflector.

In many display applications it is desirable that the self-adhering diffuser have a depolarization ratio, at 0° scattering angle, of less than about 5%, more preferably less than about 2% and even more preferably less than about 0.5%. The self-adhering diffuser would also have a depolarization ratio, at 20° scattering angle, of less than about 10%, more preferably less than about 3% and even more preferably less than about 1%. Furthermore, the self-adhering diffuser would have a depolarization ratio, at about 35° scattering angle, of less than about 20%, more preferably less than about 10% and most preferably less than about 5%.

As described above, in certain single polarizer reflective displays the self-adhering diffuser may be placed below the top polarizer. In such systems, the contrast ratio is reduced by any depolarization of the diffuser. The low depolarization of the self-adhering diffuser of the present invention allows high contrast displays to be made. This is shown in ray 327 in FIG. 3.

Figure 6E:
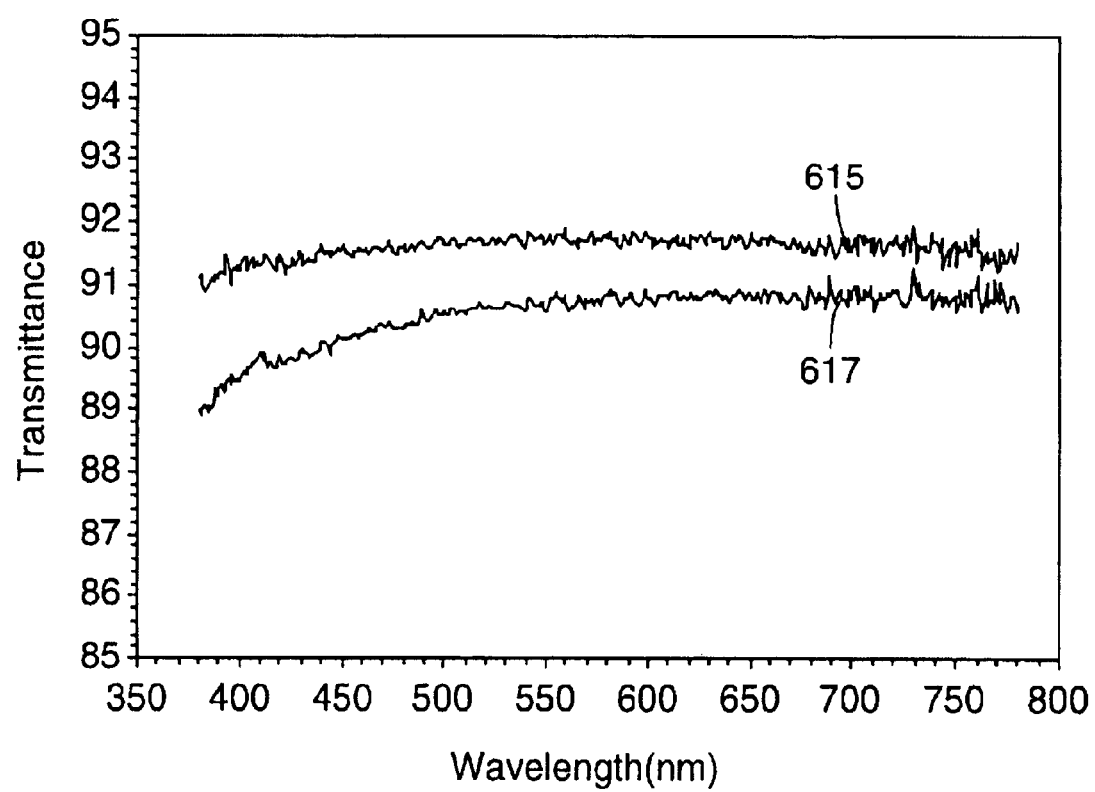

The transmission of the self-adhering diffuser was measured using samples prepared on glass slides. The transmission was measured using a Perkin Elmer Lambda 900 spectrophotometer, with the sample mounted at the entrance window of the integrating sphere. FIG. 6E plots the transmission spectra for the self-adhering diffuser slide (617) and the glass slide (615). The surface reflections of the slide are included in the plot. Without surface reflections the glass slide is 100% transmissive and the self-adhering diffuser was measured at 98.6% transmissive. Ideally, the self-adhering diffuser would have a transmission greater than about 80%, more preferably greater than about 90%, even more preferably greater than 95% and still more preferably greater than about 98%. In one embodiment, less than about 1.5% of the light is absorbed in the self-adhering diffuser. Thus, near 100% of the light is available for illumination and viewing. The transmission spectra is very flat across the visible wavelength range, imparting little color to the transmitted light allowing good color quality in the display. The high transmission of the self-adhering diffuser means that the image quality of a RLCD can be improved with no loss of brightness.

The baseline contrast of the reflective LCD is the intrinsic LCD contrast, which is further limited by three factors arising from the forward scattering front diffuser, backscattered light, depolarization and diffusion. The total LCD contrast ratio (CR) is given by the relationship:

$$1/CR = Z_i 1/CR_i,$$ Equation 1.

where the contrast ratios of the contributing factors ($CR_i$) are assumed to be non-interacting. Hence, knowing the intrinsic contrast ratio and the contributions from the diffuser, one can estimate the total contrast ratio of the LCD.

The LCD contrast can be regarded in two image regimes of scale, large area and that of minimum definable elements such as lines and single pixels. On large areas, the intrinsic contrast ratio and the depolarization and back-scatter determine the total contrast ratio. Diffusion limited contrast becomes important only when narrow lines and single pixels are displayed. Intrinsic contrast, depolarization and backscatter are the important contrast limiting factors in low and medium information content displays. Diffusion limited contrast is important is for high information content displays.

The diffusion-limited contrast of a single pixel wide line was modeled. In FIG. 3, ray 323 illustrates the diffusion of light between neighboring pixels. The model is only concerned with diffusion-limited contrast, and not the intrinsic contrast of the LCD. Therefore, the liquid crystal layer was simply treated as either a clear aperture or a black absorbing surface to simulate the on and off states. In the on state, or the case of a white line on a black background, the central line was modeled as a clear aperture surrounded by two black absorbing surfaces. The off state, or black line on a white background, was modeled as a black absorbing surface surrounded by two clear apertures. The diffuser layer was defined to transmit 100% of the incident light into a scattering trajectory determined by a Monte-Carlo method. The computation of luminance involved tracing rays backward from the observer to a source of luminance 1. To obtain statistically meaningful results, 40,000 to 250,000 rays were traced for each observer angle.

The key model parameters in the diffusion limited contrast ratio are the line width, the glass thickness and the width of the scattering distribution. The pixel or line width was set at 0.3 mm and the glass thickness was varied from 0.3 mm to 0.8 mm, a range anticipated for most LCD's. The scattering distribution was varied from 4° to 20° half-width at 1/e of the maximum intensity. That is, the angular width from the central maximum intensity to 1/e of the maximum.

Figure 6F:
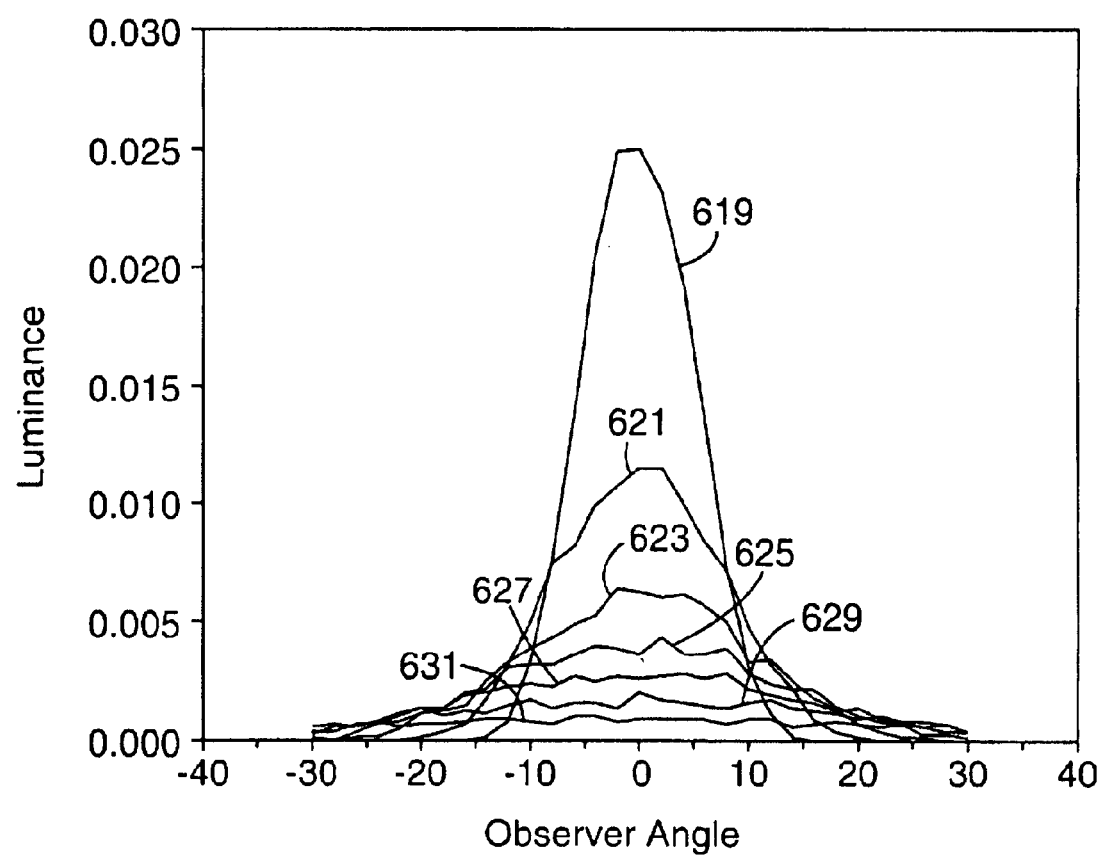
Figure 6G:
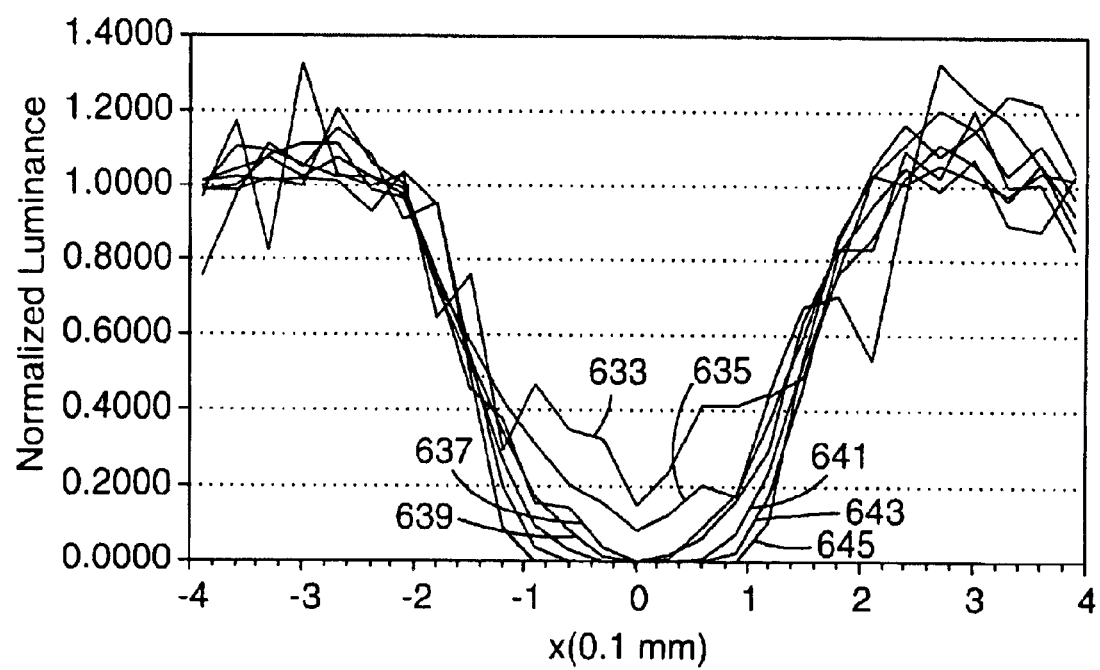

The diffuse 1/e angles and traces for FIGS. 6F and 6G are shown in Table 1.

TABLE 1

Diffuser half angle and ray numbering

| Diffuser 1/e (Viewing Angle) | FIG. 6F (Trace No.) | FIG. 6G (Trace No.) |
|---|---|---|
| 4° | 619 | 633 |
| 6° | 621 | 635 |
| 8° | 623 | 637 |
| 10° | 625 | 639 |
| 12° | 627 | 641 |
| 15° | 629 | 643 |
| 21° | 631 | 645 |

Figure 6H:
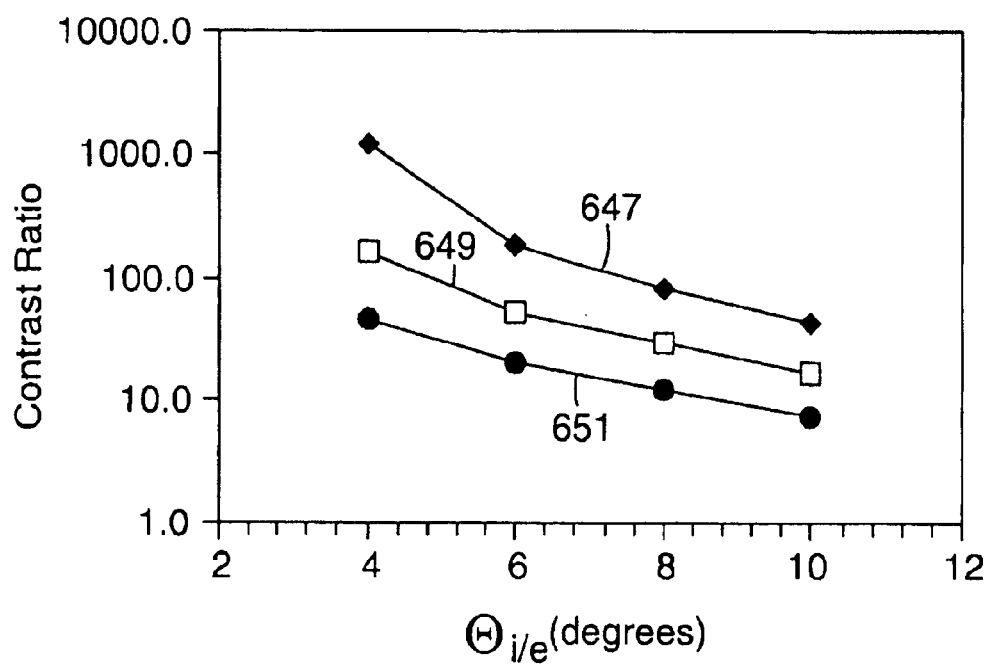

FIG. 6F is the luminance of a white line vs. angle of observation. The figure illustrates the trade off between angle of view and the maximum intensity. FIG. 6G is the luminance slice across a black line bordered by two white lines. Some diffusion is evident at the edge of the center line in the diffusion range from 4° to 6°. The diffusion widths from 10° to 20° clearly raise the background intensity at the center of the black line. The ratio of the white state luminance to the back state luminance, or contrast ratio, varies steeply at the edges of the black line, where diffusion has the strongest effect. The contrast at the center of the line width may remain high when the edges have lost contrast. In FIG. 6H, the contrast ratio is calculated as the average over the central 80% of the line width. The steep edges are neglected in the circulation. The traces 647 is a glass thickness of 0.3 mm, 649 (0.5 mm) and 647 (0.8 mm).

The effect of diffusion on the contrast ratio is determined by the geometric construction of the R-LCD, its intrinsic contrast and the diffusion width. Therefore, limits on the diffusion will be specific to the cell parameters such as glass thickness, dot pitch and intrinsic contrast. The following examples illustrate the above principles.

EXAMPLE 1

Example 1 represents high contrast 1-polarizer R-LCD such as the MTN. The intrinsic contrast ratio is 200. The diffusion-limited contrast is obtained from FIG. 6H for a diffuser of half width 6°. The backscatter and depolarization components are obtained from the analysis of the self-adhering diffuser. The backscatter has an upper limit of 0.1%. Thus, a contrast ratio of 1000 is assigned for placement of the self-adhering diffuser on top of the polarizer. Placement of the self-adhering diffuser underneath the polarizer reduces the backscatter by more than 50%. The depolarization contrast ratio is set to 2000, an arbitrarily high value, for the self-adhering diffuser on top of the polarizer. Mounted underneath the polarizer, the depolarization contrast ratio is estimated at 100 for 2 passes through the LCD. The line and area contrast ratios follow from equation 1.

TABLE 2

Diffuser on top of polarizer - High contrast display Contrast Ratio

| Glass Thickness | Intrinsic | B-scatter | Depolarization | Diffusion | Line | Area |
|---|---|---|---|---|---|---|
| 0.3 | 200 | 1000 | 2000 | 180 | 82.9 | 153.8 |
| 0.5 | 200 | 1000 | 2000 | 50 | 37.7 | 153.8 |
| 0.8 | 200 | 1000 | 2000 | 20 | 17.7 | 153.8 |

TABLE 3

Diffuser underneath polarizer - High contrast display Contrast Ratio

| Glass Thickness | Intrinsic | B-scatter | Depolarization | Diffusion | Line | Area |
|---|---|---|---|---|---|---|
| 0.3 | 200 | 2000 | 100 | 180 | 45.7 | 64.5 |
| 0.5 | 200 | 2000 | 100 | 50 | 28.2 | 64.5 |
| 0.8 | 200 | 2000 | 100 | 20 | 15.3 | 64.5 |

There is a discernable contrast improvement in the placement of the diffuser above the polarizer. The line contrast degrades due to the thicker glass substrate.

EXAMPLE 2

Example 2 represents a low contrast 1-polarizer R-LCD. The intrinsic contrast ratio is 5. The diffusion-limited contrast is obtained from FIG. 6H for a diffuser of half width 6°. The backscatter and depolarization components are obtained from the analysis of the self-adhering diffuser. The backscatter has an upper limit of 0.1%. Thus, a contrast ratio of 1000 is assigned for placement of the self-adhering diffuser on top of the polarizer. Placement of the self-adhering diffuser underneath the polarizer reduces the backscatter by more than 50%. The depolarization contrast ratio is set to 2000, an arbitrarily high value, for the self-adhering diffuser on top of the polarizer. Mounted underneath the polarizer, the depolarization contrast ratio is estimated at 100 for 2 passes through the LCD. The line and area contrast ratios follow from equation 1.

TABLE 4

Diffuser on top of polarizer - Low contrast display Contrast Ratio

| Glass Thickness | Intrinsic | B-scatter | Depolarization | Diffusion | Line | Area |
|---|---|---|---|---|---|---|
| 0.3 | 5 | 1000 | 2000 | 180 | 4.8 | 5.0 |
| 0.5 | 5 | 1000 | 2000 | 50 | 4.5 | 5.0 |
| 0.8 | 5 | 1000 | 2000 | 20 | 4.0 | 5.0 |

TABLE 5

Diffuser underneath polarizer - Low contrast display
Contrast Ratio

| Glass Thickness | Intrinsic | B-scatter | Depolarization | Diffusion | Line | Area |
|---|---|---|---|---|---|---|
| 0.3 | 5 | 2000 | 100 | 180 | 4.6 | 4.8 |
| 0.5 | 5 | 2000 | 100 | 50 | 4.3 | 4.8 |
| 0.8 | 5 | 2000 | 100 | 20 | 3.8 | 4.8 |

In this example, the placement of the diffuser, above or below the polarizer, has virtually no effect on the contrast ratio. The line contrast is somewhat degraded due to the thicker glass.

The considerations for the placement of the self-adhering diffuser are based on optical performance, ease of construction, durability and cost. It is also desirable to place the diffuser as close as possible to the liquid crystal layer to optimize diffusion limited contrast, which is decreased with increasing separation caused by the absorbing polarizer, if the self-adhering diffuser is placed on the top surface.

Figure 7:
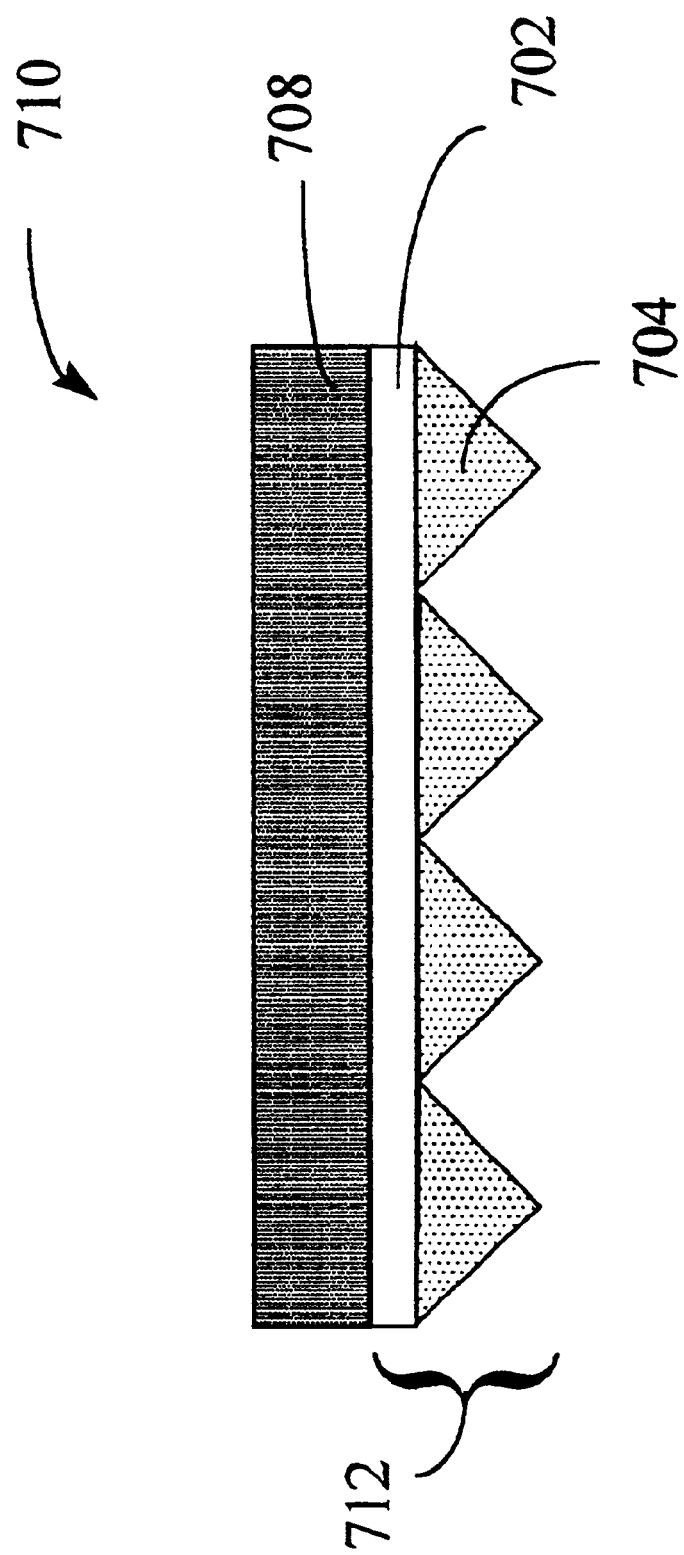
FIG. 7 is a schematic illustrating still another embodiment of the invention.
Figure 16:
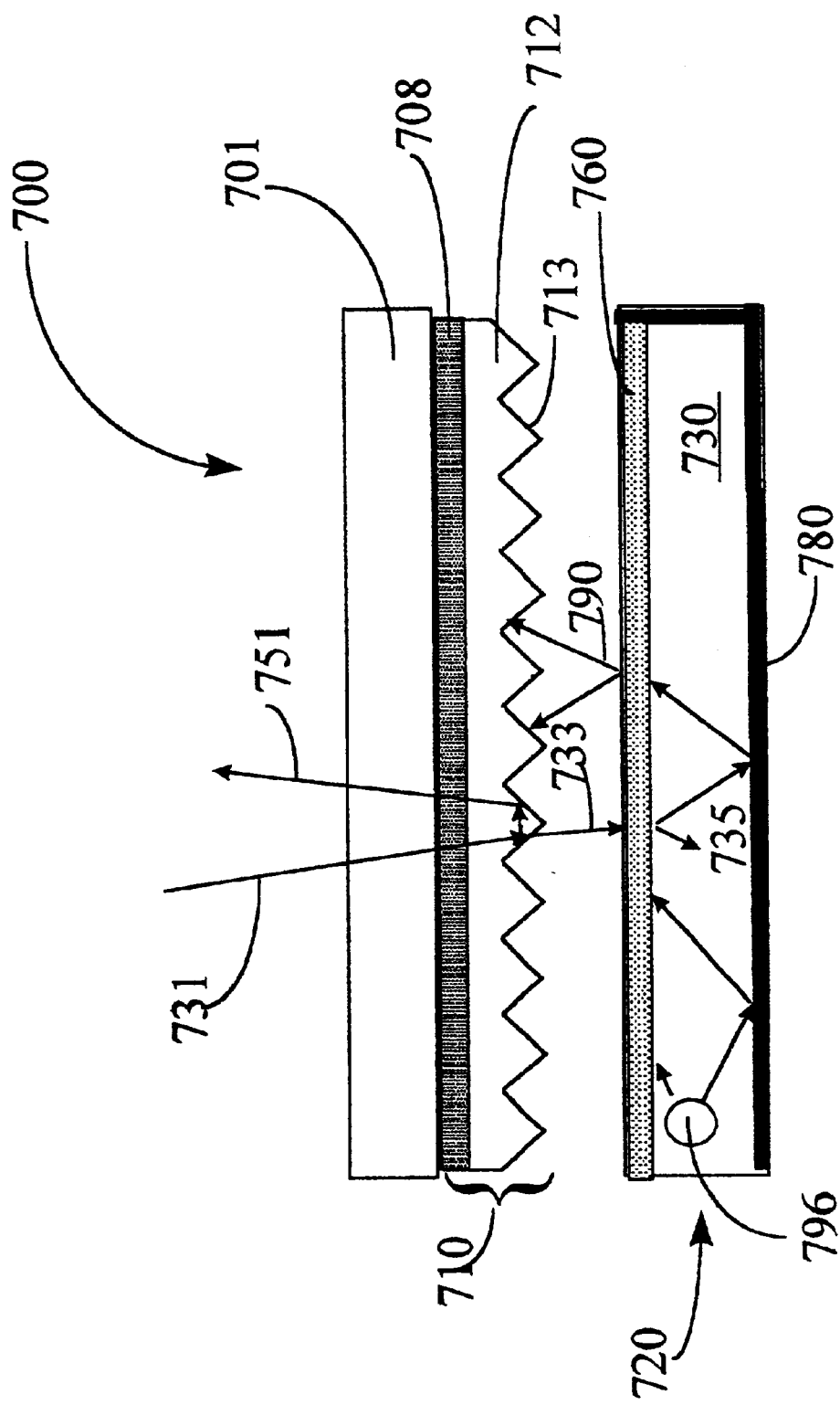
FIG. 16 is a schematic illustrating another embodiment of the invention.

In accordance with another embodiment, the diffuser of the present invention is combined with a prismatic brightness enhancing film as illustrated in FIG. 7. In FIG. 7, a prismatic structure 712 having a backing layer 702 and prism layer 704 is adhered to a diffuser 708. Where the diffuser 708 is self-adhered to the prismatic structure 712, a release liner (not shown) can be applied to the opposite surface. The release liner can be removed and the prismatic brightness enhancing film 710 can be laminated to other optical components. For example, in the embodiment of the invention depicted in FIG. 16, element 710 is useful in transflective liquid crystal display 700. Transflective display 700 comprises transmissive liquid crystal device 701, backlight 720, and transflector 710. Transflector 710 comprises prismatic brightness enhancing film 712 that is laminated to liquid crystal display device 701 via the self-adhering diffuser 708. When a ray 731 of ambient light passes through liquid crystal device 701, it impinges on prismatic surface 713 and is partially reflected back through device 701. Light which is not reflected by prismatic surface 713 passes on to diffuser 760, and then into optical cavity 730 where it is reflected by reflective surface 780, and passes back out of cavity 730, through diffuser 760, and onto prism surface 713. Prism surface 713 now acts as a light redirecting film so as to improve utilization of light reflected from surface 780 of backlight 720. When liquid crystal device 710 is transmissively illuminated, light from lamp 796 is either reflected onto diffuser 760 by reflector 780, or impinges on diffuser 760 directly, whereupon it is diffusely transmitted to prism surface 713. The prismatic structure acts as a brightness enhancer. The light transmitted through the prismatic structure 710 is transmitted through liquid crystal device 701.

Figure 8:
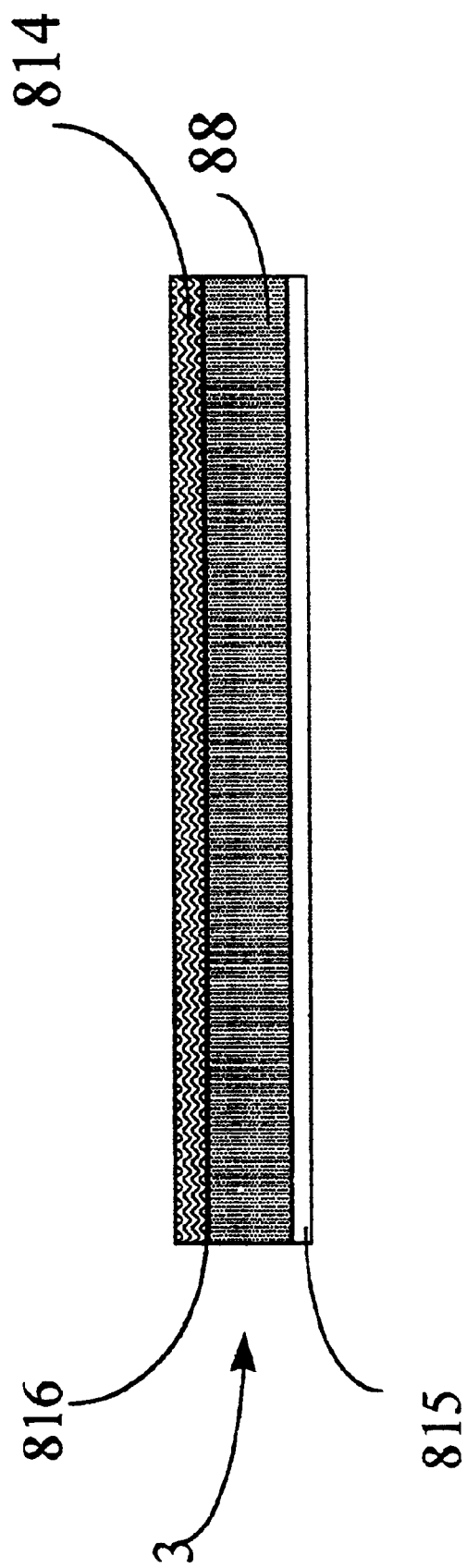
FIG. 8 is a schematic illustrating another embodiment of the invention.
Figure 9:
FIG. 9 is a schematic illustrating still another embodiment of the invention.

In another embodiment of the present invention, shown in FIG. 8, a self-adhering diffuser 88 is applied as a coating to a liner 815 and cured, after which an optical element 814 is applied as a coating over diffuser 88. Additionally, interface 816 between diffuser 88 and the optical element 814 can be structured by embossing or otherwise forming a structured pattern into diffuser 88 prior to coating. The optical component 814 may then be laminated a substrate (other optical component) by removing liner 815. In still another embodiment of the present invention, shown in FIG. 9, an optical element 916 is formed by additional curing of a portion of a self adhering diffuser 98 to a more completely cured state. The cured optical element, preferably non-adhesive, may additionally have a surface structure therein.

Figure 10:
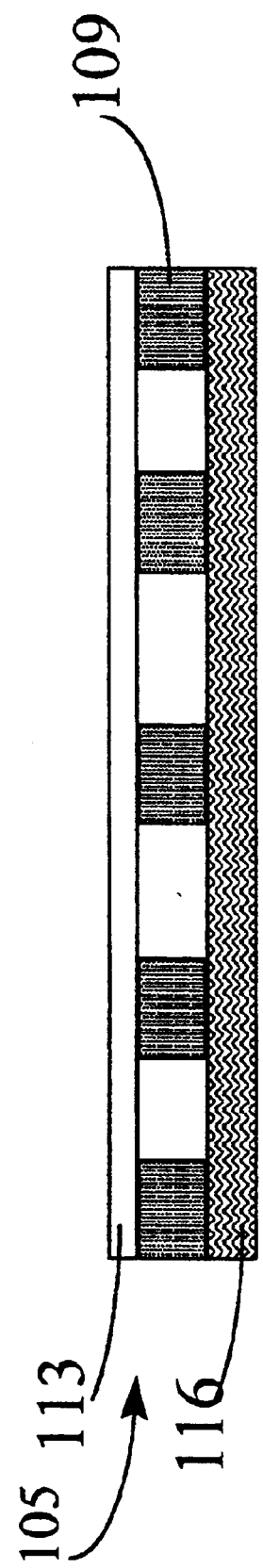
FIG. 10 is a schematic illustrating another embodiment of the invention.
Figure 14:
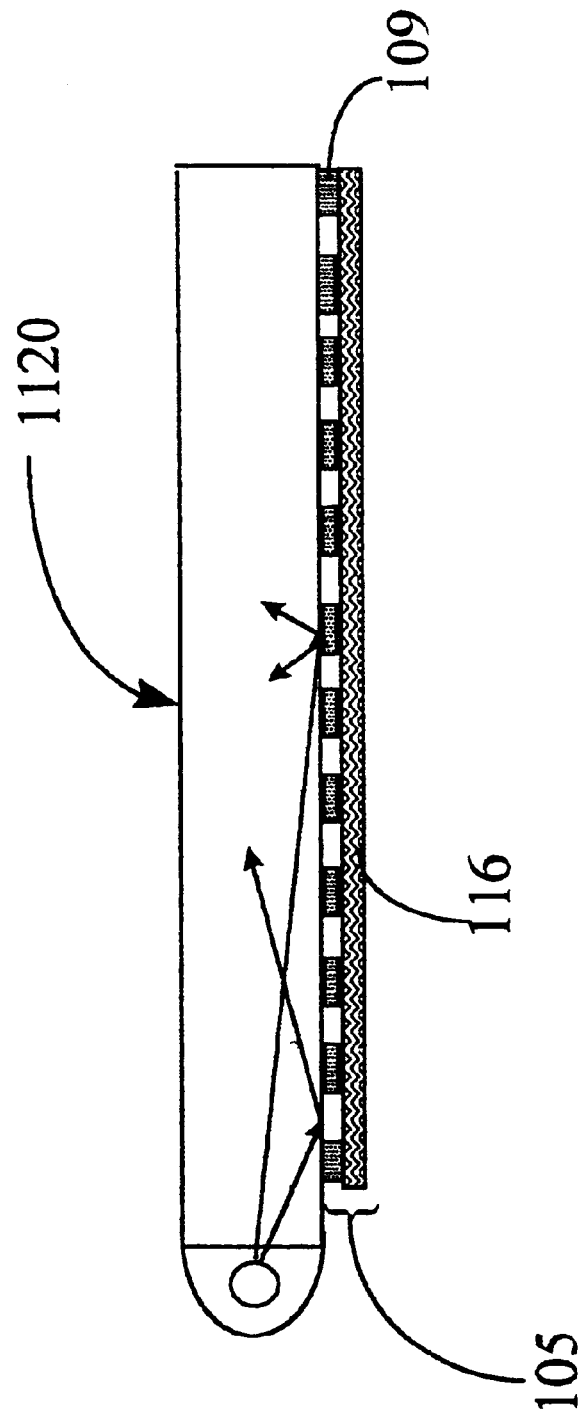
FIG. 14 is a schematic illustrating another embodiment of the invention.

FIG. 10 illustrates an embodiment of the present invention in which a self-adhering diffuser 109 is applied as a pattern, rather than as a continuous layer, to another optical element. As in the above various embodiments, the patterned self-adhering diffuser can be formed between two release liners or may be applied to an optical component (e.g., layer 11 6,can be a removable release liner or an optical component). In one particular embodiment, illustrated in FIG. 14, the patterned self-adhering diffuser 109 may be applied to a reflecting material 116 (e.g., a diffusely reflecting mirror) the combination of which is adhered, via the patterned diffuser 109, to an edge-lit light guide 1120 of a liquid crystal display backlight. In such an embodiment, the spots of patterned diffuser 109 diffuse light sufficiently so as to permit the light to exit the top of the light guide 1120 to illuminate a liquid crystal panel (not shown). In this instance, diffusing adhesive layer 109 may not need to be limited to only forward scattering, but could also include backscattering. Also, since one of the functions of light recirculating in LCD illumination systems is to randomize polarization, layer 109 may not need to be polarization preserving in this case, though it could be, provided element 116 is able to randomize or otherwise alter the polarization of any polarized light impinging upon it. The pattern of the diffuser 109 may be varied across to light guide in a manner similar to that of screen-printed diffusion patterns so as to provide uniform illumination of the liquid crystal display.

Figure 15:
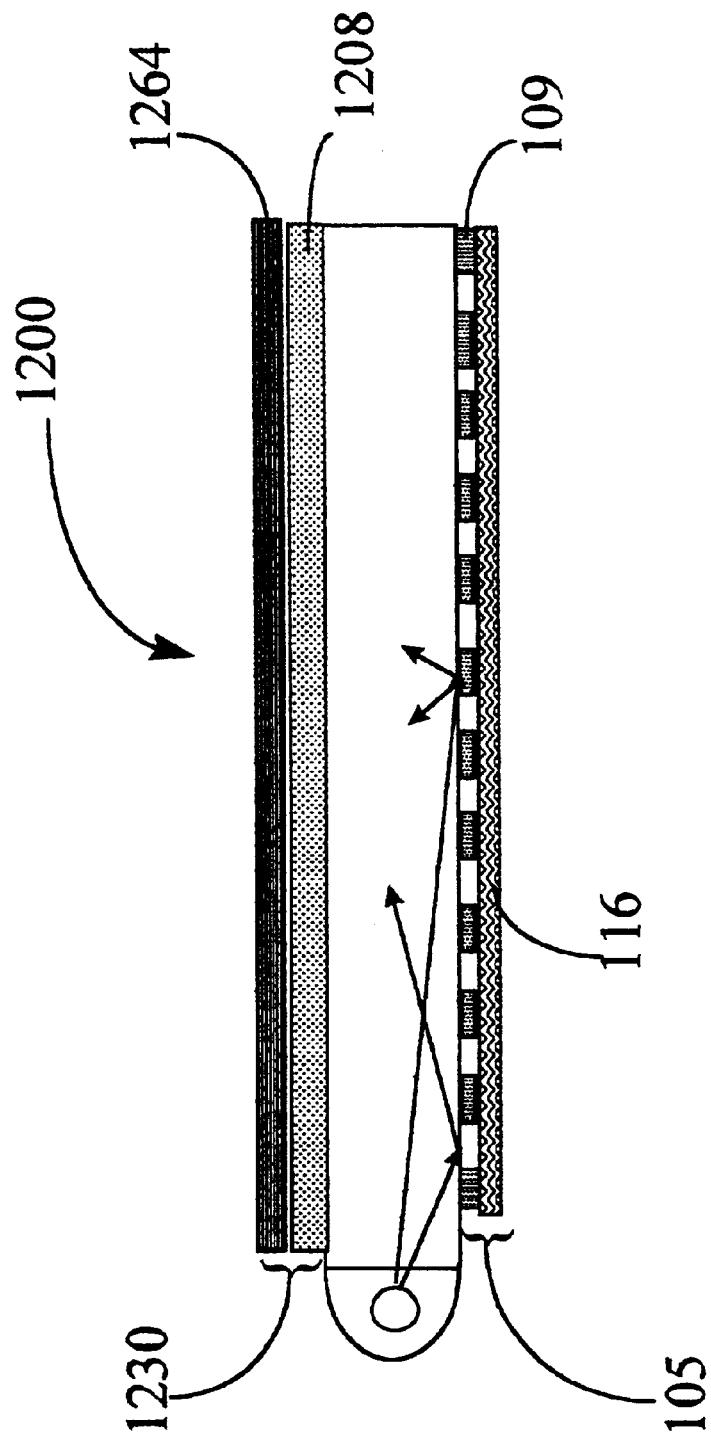
FIG. 15 is a schematic illustrating still another embodiment of the invention.

In still another embodiment, an additional self-adhering diffuser 1208 may be used to laminate another optical component 1264 to the top surface of the backlight, as shown in FIG. 15. Depending on the overall construction of the liquid crystal display, the additional optical component 1264 may be a reflective polarizer, an absorbing polarizer, a structured light redirecting film and the like. The diffuser 1208 may serve to help hide the pattern of the patterned diffuser 109.

Figure 11:
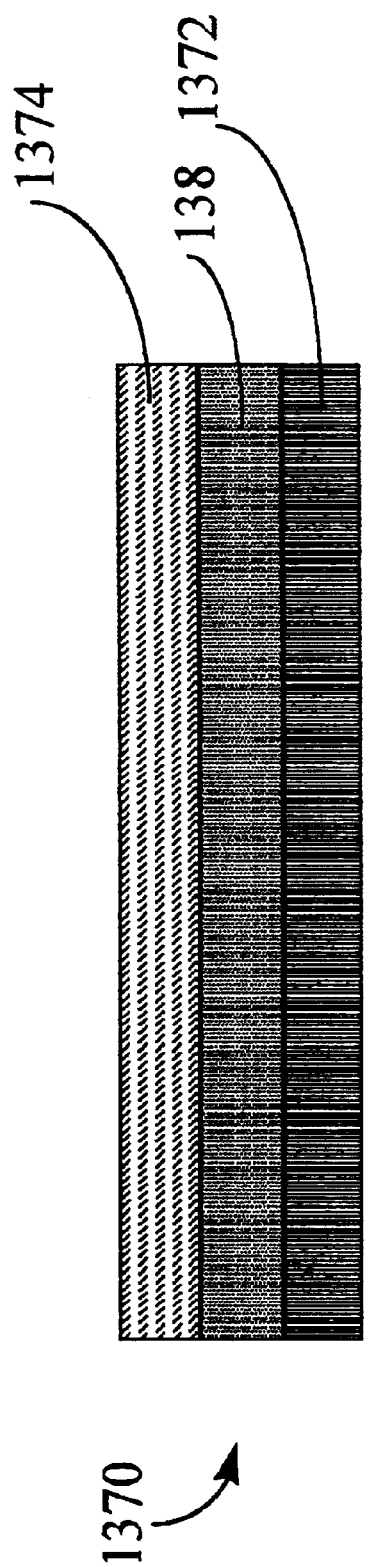
FIG. 11 is a schematic illustrating still another embodiment of the invention.

Referring to FIG. 11, yet another embodiment of the present invention provides an optical component having layers 1372 and 1374 which arc optical elements sandwiching a self-adhering diffuser 1308. The diffuser 1308 holds layers 1372 and 1374 together as a complete optical component which need not be adhered to any other surface. When layer 1372 is a reflecting polarizer and layer 1374 is a flat transparent or diffusing sheet of glass or plastic, the resulting optical component can be used as a light recirculating polarizer for a polarized light source which can serve, for example, as a backlighting panel for a liquid crystal display.

Figure 12:
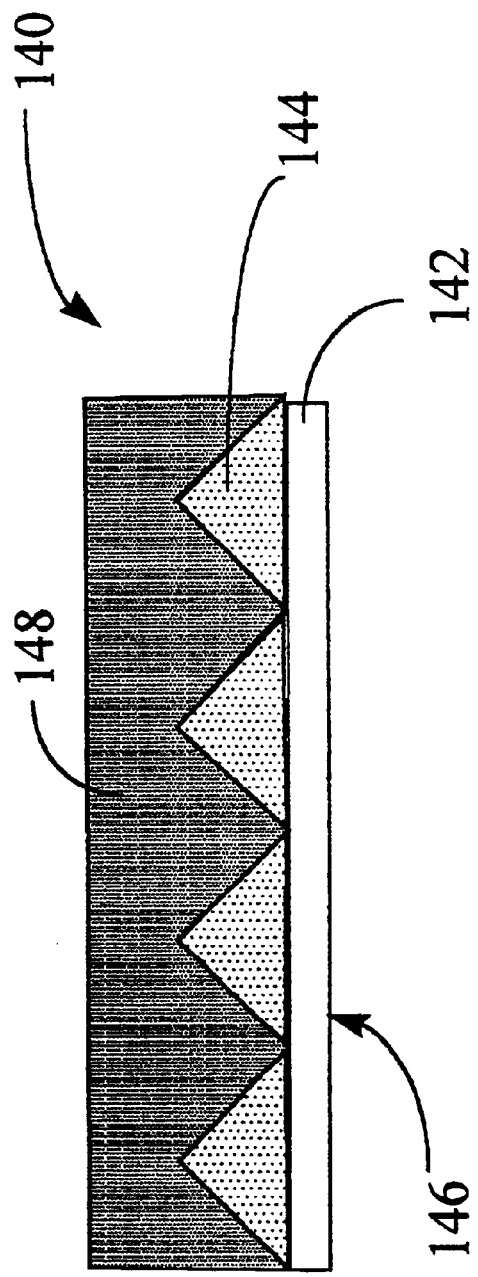
FIG. 12 is a schematic illustrating another embodiment of the invention.

Referring to FIG. 12, a conformable diffuser 148 is disposed on a structured optical element 146. The structure optical element can be a structured film with the prismatic or otherwise structured elements 144 facing the diffuser 148. Prismatic elements 144 can be linear elements, pyramidally shaped elements, lens shaped elements, or elements having other useful shapes. Elements 144 may all be of the same shape, or may be differently shaped, so as to perform, for example, a Fresnel lens function. When the refractive index of structured elements 144 differs from that of the diffuser 148, a light redirecting effect can be achieved which is useful in reducing glare in electronic displays. The optical elements illustrated in FIG. 12 can be made by laminating a transferable diffuser to the structured surface. Alternatively, the self-adhering diffuser may be directly coated onto the structured surface and cured to a pressure sensitive adhesive state. The top of the optical elements 140 may laminate to another optical component using the adhesive nature of the diffuser 148.

Figure 13:
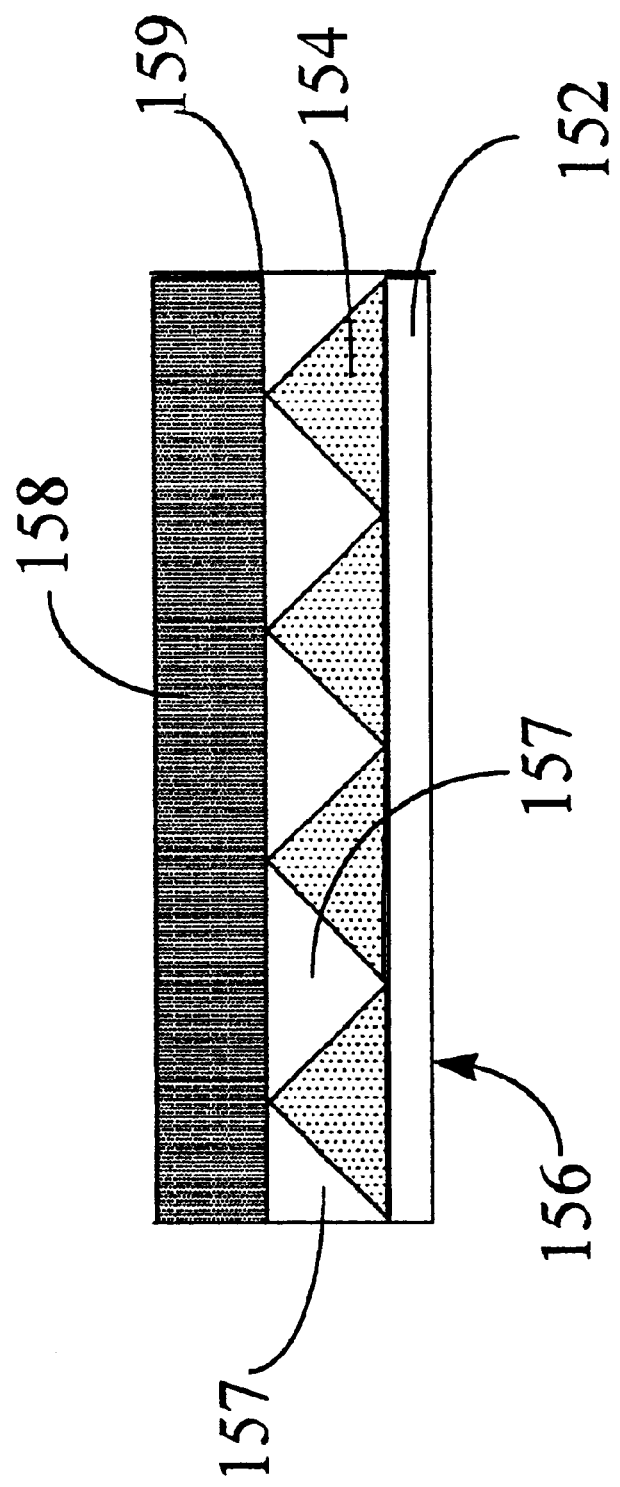
FIG. 13 is a schematic illustrating still another embodiment of the invention.

Referring to FIG. 13, structured film 156 comprises backing layer 152 and structured layer 154. The elements making up structured layer 154 may be linear prisms, pyramidally shaped prisms, lenses, or other shapes which provide useful optical effects. Cavities 157 are filled with a clear adhesive or other suitable transparent material, and diffusing layer 158 is adhesively attached to surface 159 of the material filling cavities 157. When the refractive indices of structures 154 and the material filling cavities 157 differ, a beam of light passing through these layers is redirected in a different optical direction.

To optimize the use of available ambient light, gain and directionality are built into a RLCD. There is a geometric relationship between the viewer, the reflective display and the light source, which provides the best viewing condition. Normally the glare peak from the front surface of the display coincides with the intensity peak of the LCD backreflector. Hence, the optimal orientation results from a trade-off between brightness and contrast. Light redirection allows one to separate the glare peak from the intensity peak of the backreflected light.

Figure 17:
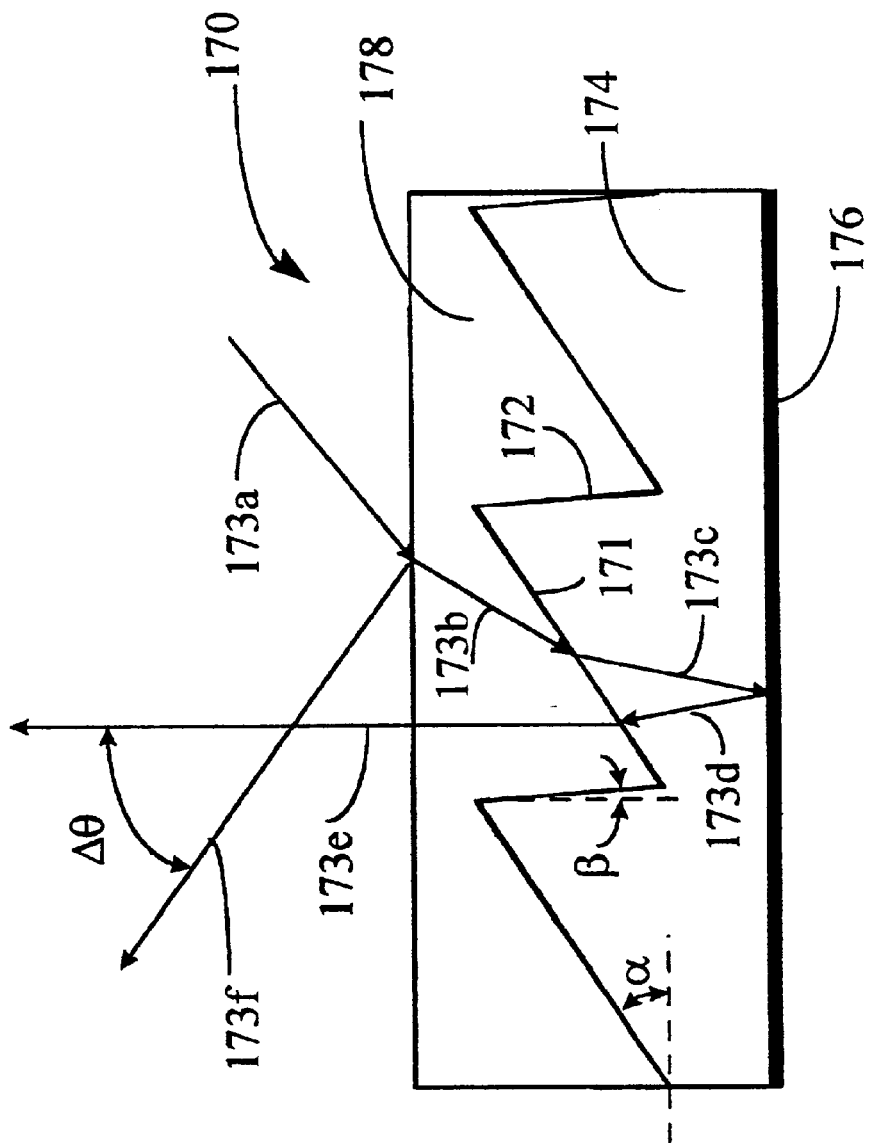
FIG. 17 is a schematic illustrating still another embodiment of the invention.

FIG. 17 illustrates the process of refractive light redirection. Structure 170 includes a mirror surface 176, a microstructured polymer 174 and a filler 178. Light ray 173$a$ enters layer 178 from air and the transmitted ray 173$b$ is bent toward the normal. In this diagram layer 174 has a higher optical index than layer 178. Thus, transmitted ray 173$c$ is bent toward the normal of the interface between layers 178 and 174. Reflected ray 173$d$ follows the usual path for reflected light at a specular mirror surface. Transmitted ray 173$e$ bends away from the normal of the interface between layers 178 and 174 and subsequently transmits through the air interface toward an observer. Ray 173$e$ exits the structure at an angle substantially different from the glare ray 173$f$. FIG. 17 shows a structure 170 having layer 174 adjacent to a layer 178 of lower optical index. In another embodiment, useful light redirecting effects are obtained if layer 178 has a higher optical index than layer 174.

In FIG. 17, layer 178 is a clear filler, but it may be understood that an added diffuser function spreads the reflected intensity pattern of the back reflected light (represented by ray 173$e$) and does not substantially change the peak direction or the total backreflected energy. The diffuser function can be included in the filler 178 as it is in FIG. 12 or as a separate layer as it is in FIG. 13. The refractive light redirection effect of light incident upon the structure 170 of FIG. 17 was modeled. The optical index of the microstructured polymer 174, was chosen to be 1.6. The optical index of a clear filler 178 was taken to be 1.43. The prismatic surface was taken to be a 2-facet structure, facet 172 making an angle a with the film plane direction and facet 172 making an angle β with the film plane normal.

A useful beam steering effect was found over a wide range of incident light angle. The deflection angle (ΔΘ), the difference between the reflected angle (Θ) of the glare peak and that of the peak backreflected intensity was of the order 10°. The following examples illustrate various aspects of the above discussion.

EXAMPLE 3

In Example 3, the various parameters depicted in FIG. 17 were selected as follows: α=35°, β=5°, angle of incident light=15°, optical index of the clear filler=1.43, optical index of the microstructured polymer=1.6. The resultant optical component exhibits the following characteristics:

|  | R(%) | θ |
|---|---|---|
| Primary backreflected peak | 70 | 0° |
| Glare peak | 4 | 15° |

EXAMPLE 4

In Example 4, the various parameters were selected as follows: α=25°, β=5°, angle of incident light=15°, optical index of the clear filler=1.43, optical index of the microstructured polymer=1.6. The resultant optical component exhibits the following characteristics:

|  | R(%) | θ |
|---|---|---|
| Primary backreflected peak | 70 | 5° |
| Glare peak | 4 | 15° |

The optical indices in Examples 3 and 4 were chosen to match the widest Δn consistent with low material cost, and excellent adhesive performance. A wider range of selection would result by relaxing these constraints. The self-adhering diffuser or clear filler can be chosen from a set of materials with optical indices ranging from 1.35 to 1.49, including; acrylate, silicone and fluoro-acrylate compounds. The microstructured polymer can be chosen from a set of materials, referenced in WO 97/01610, whose indices range from 1.34 to 1.63. Polymers having an optical index above this range can also be used. The expanded material set includes a wider range of resulting Δn, hence an expanded range of optical deflection angle can be achieved.

The light redirecting effect of the above embodiments is due to refraction at the prismatic interface. Hence, the strength the effect generally increases with Δn and with the angle α, of FIG. 17. If Δn is very large, the prismatic surface may contribute an unwanted reflection. For example, a Δn of about 0.6 would provide normal surface reflection of about 3.3%. In some instances that could diminish the contrast of a display. In the 2-facet microstructure, the angle α may range from about 5° to 75°; more preferably about 15° to 45°, and most preferably 25° to 35°. The optical index mismatch Δn must be greater than about 0.05 to achieve an appreciable value for ΔΘ. More preferably An is greater than about 0.1, and most preferably Δn is greater than about 0. 15.

The performance of the microstructure may also benefit from more complex features such as; rounded prisms, multiple facets, spatially varying pitch or spatially varying facet angle. The light redirecting structures described may be used in 1-polarizer, 2-polarizer or 0-polarizer reflective LCDs. They can be positioned generally in the display, since their intended function is geometric. When used between the polarizers of a 2-polarizer LCD or between the polarizer and the backreflector of a 1-polarizer LCD, the constituent materials must exhibit low birefringence and low polarization scattering.

While the present invention has been described above with reference to various embodiments and examples, it should not be limited to the specifics of the embodiments and examples. Rather, the intention is to fully cover the invention as set out in the attached claims.

What is claimed is:

1. An optical component, comprising:
   a structured polymer layer comprising one side having structured elements;
   a filler layer adjacent to the side of the structured polymer layer having the structured elements, the filler layer filling in the structured elements and having one substantially planar side, wherein the filler layer comprises a diffusing material;
   a mirror surface positioned to backreflect light transmitted through the structured polymer and the filler layer;
   wherein the filler layer has a refractive index $N_f$, the structured polymer layer has a refractive index of $N_s$, and Ns is different from $N_f$;
   whereby ambient light that is backreflected from the mirror surface is directed to a peak angle that is different from a glare peak angle of the optical component.

2. The optical component of claim 1, wherein the difference between $N_s$ and $N_f$ is at least 0.05.

3. The optical component of claim 1, wherein the difference between $N_s$ and $N_f$ is at least 0.1.

4. The optical component of claim 1, wherein the difference between $N_s$ and $N_f$ is at least 0.15.

5. The optical component of claim 1, wherein $N_s$ is greater than $N_f$.

6. The optical component of claim 1, wherein $N_s$ is greater than or equal to about 1.34 and less than or equal to about 1.63.

7. The optical component of claim 1, wherein $N_s$ is greater than or equal to about 1.34.

8. The optical component of claim 1, wherein $N_s$ is about 1.6.

9. The optical component of claim 1, wherein $N_f$ is greater than or equal to about 1.35 and less than or equal to about 1.49.

10. The optical component of claim 1, wherein $N_f$ is about 1.43.

11. The optical component of claim 1, wherein the filler layer comprises a diffuse adhesive material.

12. The optical component of claim 1, further comprising a diffusing layer.

13. The optical component of claim 12, wherein the diffusing layer is adjacent to the filler layer.

14. The optical element of claim 1, wherein the structured elements comprise prismatic elements.

15. The optical component of claim 14, wherein the prismatic elements comprise a first facet and a second facet and the first facet is at an angle of about 5 degrees to about 75 degrees from a plane of the mirror surface.

16. The optical component of claim 15, wherein the first facet is at an angle of about 15 degrees to about 45 degrees from the plane of the mirror surface.

17. The optical component of claim 15, wherein the first facet is at an angle of about 25 degrees to about 35 degrees from the plane of the mirror surface.

18. The optical component of claim 14, wherein the prismatic elements comprise a first facet and a second facet and the second facet is at an angle of about 5 degrees from a normal to a plane of the mirror surface.

19. The optical component of claim 1 wherein the structured elements of the structured polymer layer comprise linear pyramidally shaped elements.

20. The optical component of claim 1 wherein the structured elements of the structured polymer layer comprise lens shaped elements.

21. The optical component of claim 1 wherein the structured elements of the structured polymer layer comprise differently-shaped elements.

22. The optical component of claim 1 wherein the structured elements of the structured polymer layer comprise rounded prismatic structures.

23. The optical component of claim 1 wherein the structured elements comprises more than two facets.

24. The optical component of claim 1 wherein the structured elements have a spatially varying pitch.

25. The optical component of claim 1 wherein the structured elements comprise at least one facet having a spatially varying facet angle.

26. A display device comprising:
    a first and second polarizer;
    a liquid crystal layer below the first polarizer;
    a mirror surface below the liquid crystal layer; and
    an optical component including a structured polymer layer and a filler layer, the structured polymer layer comprising one side having structured elements and the filler layer being adjacent to the side of the structured polymer layer having the structured elements, the filler layer filling in the structured elements and having one substantially planar side, wherein the filler layer comprises a diffusing material;
    wherein the filler layer has a refractive index $N_f$, the structured polymer layer has a refractive index of $N_s$, $N_s$ is different from $N_f$;
    whereby ambient light that is backreflected from the mirror surface is directed to a peak angle that is different from a glare peak angle of the optical component.

27. The display device of claim 26, wherein the structured polymer layer and filler layer are between the first and second polarizers.

28. A display device comprising:
    a polarizer;
    a liquid crystal layer below the polarizer;
    a mirror surface below the liquid crystal layer; and
    an optical component including a structured polymer layer and a filler layer, the optical component being above the liquid crystal layer, the structured polymer layer comprising one side having structured elements, the filler layer being adjacent to the side of the structured polymer layer having the structured elements, the filler layer filling in the structured elements and having one substantially planar side, wherein the filler layer comprises a diffusing material;
    wherein the filler layer has a refractive index $N_f$ and the structured polymer layer has a refractive index of $N_s$, $N_s$ is different from $N_f$, and the structured polymer layer and the filler layer are between the polarizer and the mirror layer;
    whereby ambient light that is backreflected from the mirror surface is directed to a peak angle that is different from a glare peak angle of the optical component.

29. A display device comprising:
    a polarizer
    a liquid crystal layer below the polarizer;
    a mirror surface below the liquid crystal layer; and
    a structured polymer layer comprising one side having structured elements; and
    an optical component including a structured polymer layer and a filler layer, the optical component being between the liquid crystal and the mirror surface, the structured polymer layer comprising one side having structured elements, the filler layer being adjacent to the side of the structured polymer layer having the structured elements, the filler layer filling in the structured elements and having one substantially planar side, wherein the filler layer comprises a diffusing material;

wherein the filler layer has a refractive index $N_f$ and the structured polymer layer has a refractive index of $N_s$, $N_s$ is different from $N_f$, and the structured polymer layer and the filler layer are between the polarizer and the mirror layer;

whereby ambient light that is backreflected from the mirror surface is directed to a peak angle that is different from a glare peak angle of the optical component.

30. The display device according to any of claims 26–29, wherein the display device is a reflective liquid crystal display.

31. The display device according to any of claims 26–29, wherein the display device is a transflective liquid crystal display.

32. An optical component, comprising:

a structured polymer layer comprising one side having structured elements;

a filler layer adjacent to the side of the structured polymer layer having the structured elements, the filler layer filling in the structured elements and having one substantially planar side;

a diffusing layer adjacent to the filler layer;

a mirror surface positioned to backreflect light transmitted through the structured polymer and the filler layer;

wherein the filler layer has a refractive index $N_f$, the structured polymer layer has a refractive index of $N_s$, and Ns is different from $N_f$;

whereby ambient light that is backreflected from the mirror surface is directed to a peak angle that is different from a glare peak angle of the optical component.

33. The optical component of claim 32, wherein the difference between $N_s$ and $N_f$ is at least 0.05.

34. The optical component of claim 32, wherein the difference between $N_s$ and $N_f$ is at least 0.1.

35. The optical component of claim 32, wherein the difference between $N_s$ and $N_f$ is at least 0.15.

36. The optical component of claim 32, wherein $N_s$ is greater than $N_f$.

37. The optical component of claim 32, wherein $N_s$ is greater than or equal to about 1.34 and less than or equal to about 1.63.

38. The optical component of claim 32, wherein $N_s$ is greater than or equal to about 1.34.

39. The optical component of claim 32, wherein $N_s$ is about 1.6.

40. The optical component of claim 32, wherein $N_f$ is greater than or equal to about 1.35 and less than or equal to about 1.49.

41. The optical component of claim 32, wherein $N_f$ is about 1.43.

42. The optical component of claim 32, wherein the filler layer comprises a diffusing material.

43. The optical component of claim 32, wherein the filler layer comprises a diffuse adhesive material.

44. The optical element of claim 32, wherein the structured elements comprise prismatic elements.

45. The optical component of claim 44, wherein the prismatic elements comprise a first facet and a second facet and the first facet is at an angle of about 5 degrees to about 75 degrees from a plane of the mirror surface.

46. The optical component of claim 45, wherein the first facet is at an angle of about 15 degrees to about 45 degrees from the plane of the mirror surface.

47. The optical component of claim 45, wherein the first facet is at an angle of about 25 degrees to about 35 degrees from the plane of the mirror surface.

48. The optical component of claim 44, wherein the prismatic elements comprise a first facet and a second facet and the second facet is at an angle of about 5 degrees from a normal to a plane of the mirror surface.

49. The optical component of claim 32 wherein the structured elements of the structured polymer layer comprise linear pyramidally shaped elements.

50. The optical component of claim 32 wherein the structured elements of the structured polymer layer comprise lens shaped elements.

51. The optical component of claim 32 wherein the structured elements of the structured polymer layer comprise differently-shaped elements.

52. The optical component of claim 32 wherein the structured elements of the structured polymer layer comprise rounded prismatic structures.

53. The optical component of claim 32 wherein the structured elements comprises more than two facets.

54. The optical component of claim 32 wherein the structured elements have a spatially varying pitch.

55. The optical component of claim 32 wherein the structured elements comprise at least one facet having a spatially varying facet angle.

56. A display device comprising:

a first and second polarizer;

a liquid crystal layer below the first polarizer;

a mirror surface below the liquid crystal layer; and an optical component including a structured polymer layer and a filler layer, the structured polymer layer comprising one side having structured elements and the filler layer being adjacent to the side of the structured polymer layer having the structured elements, the filler layer filling in the structured elements and having one substantially planar side, the optical component further comprising a diffusing layer adjacent to the filler layer;

wherein the filler layer has a refractive index $N_f$, the structured polymer layer has a refractive index of $N_s$, $N_s$ is different from $N_f$;

whereby ambient light that is backreflected from the mirror surface is directed to a peak angle that is different from a glare peak angle of the optical component.

57. The display device of claim 56, wherein the structured polymer layer and filler layer are between the first and second polarizers.

58. The display device of claim 56, wherein the display device is a reflective liquid crystal display.

59. The display device of claim 56, wherein the display device is a transflective liquid crystal display.

60. A display device comprising:

a polarizer;

a liquid crystal layer below the polarizer;

a mirror surface below the liquid crystal layer; and an optical component including a structured polymer layer and a filler layer, the optical component being above the liquid crystal layer, the structured polymer layer comprising one side having structured elements, the filler layer being adjacent to the side of the structured polymer layer having the structured elements, the filler layer filling in the structured elements and having one substantially planar side, the type optical component further comprising a diffusing layer adjacent to the filler layer;

wherein the filler layer has a refractive index $N_f$ and the structured polymer layer has a refractive index of $N_s$, $N_s$ is different from $N_f$, and the structured polymer layer and the filler layer are between the polarizer and the mirror layer;

whereby ambient light that is backreflected from the mirror surface is directed to a peak angle that is different from a glare peak angle of the optical component.

61. The display device of claim 60, wherein the display device is a reflective liquid crystal display.

62. The display device of claim 60, wherein the display device is a transflective liquid crystal display.

63. A display device comprising:

a polarizer a liquid crystal layer below the polarizer;

a mirror surface below the liquid crystal layer; and a structured polymer layer comprising one side having structured elements; and an optical component including a structured polymer layer and a filler layer, the optical component being between the liquid crystal and the mirror surface, the structured polymer layer comprising one side having structured elements, the filler layer being adjacent to the side of the structured polymer layer having the structured elements, the filler layer filling in the structured elements and having one substantially planar side, the 50 optical component further comprising a diffusing layer adjacent to the filler layer;

wherein the filler layer has a refractive index $N_f$ and the structured polymer layer has a refractive index of $N_s$, $N_s$ is different from $N_f$; and the structured polymer layer and the filler layer are between the polarizer and the mirror layer;

whereby ambient light that is backreflected from the mirror surface is directed to a peak angle that is different from a glare peak angle of the optical component.

64. The display device of claim 63, wherein the display device is a reflective liquid crystal display.

65. The display device of claim 63, wherein the display device is a transflective liquid crystal display.

* * * * *

UNITED STATES PATENT AND TRADEMARK OFFICE
CERTIFICATE OF CORRECTION

PATENT NO. : 6,801,276 B1
DATED : October 5, 2004
INVENTOR(S) : Epstein, Kenneth A.

It is certified that error appears in the above-identified patent and that said Letters Patent is hereby corrected as shown below:

Column 1,
Line 52, delete "," following "$N_s$"

Column 2,
Lines 20 and 22, delete "$N_s$" and insert -- $N_f$ --, therefore

Column 8,
Line 20, delete "An" and insert -- $\Delta n$ -- therefore

Column 9,
Line 13, delete "an" before "embodiment"
Line 37, delete "is" before "block"

Column 10,
Line 64, delete "is" after "important"

Column 11,
Line 49, delete "back" and insert -- black -- therefore
Line 55, delete "circulation" and insert -- calculation -- therefore Column 14,
Line 9, delete "11 6" and insert -- 116 -- therefore
Line 41, delete "arc" and insert -- are -- therefore Column 16,
Lines 5 and 20, delete "$\theta$" and insert -- $\Theta$ -- therefore
Lines 37 and 50, delete "An" and insert -- $\Delta n$ -- therefore Column 17,
Line 15, delete "Ns" and insert -- $N_s$ --

Column 18,
Line 61, insert -- ; -- following "polarizer"

Column 19,
Line 37, delete "Ns" and insert -- $N_s$ -- therefore

UNITED STATES PATENT AND TRADEMARK OFFICE
CERTIFICATE OF CORRECTION

PATENT NO. : 6,801,276 B1
DATED : October 5, 2004
INVENTOR(S) : Epstein, Kenneth A.

It is certified that error appears in the above-identified patent and that said Letters Patent is hereby corrected as shown below:

Column 21,
Line 24, insert -- ; -- following "polarizer"

Signed and Sealed this

Fifth Day of April, 2005

JON W. DUDAS
*Director of the United States Patent and Trademark Office*